United States Patent
Choi et al.

(10) Patent No.: US 10,630,887 B2
(45) Date of Patent: Apr. 21, 2020

(54) WEARABLE DEVICE FOR CHANGING FOCAL POINT OF CAMERA AND METHOD THEREOF

(71) Applicant: SAMSUNG ELECTRONICS CO., LTD., Suwon-si (KR)

(72) Inventors: Hyun-soo Choi, Seoul (KR); Chang-han Kim, Suwon-si (KR); Moon-sik Jeong, Seongnam-si (KR); So-won Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/576,501

(22) PCT Filed: Jun. 3, 2016

(86) PCT No.: PCT/KR2016/005921
§ 371 (c)(1),
(2) Date: Nov. 22, 2017

(87) PCT Pub. No.: WO2016/200102
PCT Pub. Date: Dec. 15, 2016

(65) Prior Publication Data
US 2018/0176459 A1 Jun. 21, 2018

(30) Foreign Application Priority Data
Jun. 11, 2015 (KR) .......................... 10-2015-0082572

(51) Int. Cl.
*H04N 5/232* (2006.01)
*G06F 1/16* (2006.01)
(Continued)

(52) U.S. Cl.
CPC ........... *H04N 5/23216* (2013.01); *G06F 1/16* (2013.01); *G06F 1/163* (2013.01); *G06F 3/013* (2013.01);
(Continued)

(58) Field of Classification Search
CPC ........... H04N 5/23216; H04N 5/23203; H04N 5/23293; H04N 5/23219; H04N 5/23212;
(Continued)

(56) References Cited

U.S. PATENT DOCUMENTS 9,304,319 B2 * 4/2016 Bar-Zeev ................. G02B 3/14
2002/0140803 A1 * 10/2002 Gutta ...................... H04N 5/232
348/14.01

(Continued)

FOREIGN PATENT DOCUMENTS

| JP | 2013-88906 A | 5/2013 |
| WO | 2013/180317 A1 | 12/2013 |

OTHER PUBLICATIONS

International Search Report dated Sep. 13, 2016, issued by the International Searching Authority in counterpart International Patent Application No. PCT/KR2016/005921 (PCT/ISA/210).
(Continued)

*Primary Examiner* — Lin Ye
*Assistant Examiner* — Chan T Nguyen
(74) *Attorney, Agent, or Firm* — Sughrue Mion, PLLC

(57) ABSTRACT

Provided are a method used by a user to change focus of a camera to a particular point with respect to a target object via a wearable device and the wearable device performing the method. The wearable device may display a target object image displayed on a preview display of the camera and may receive a user input for changing focus to a particular point of the target object image. The wearable device may request the camera to change focus based on the user input.

11 Claims, 20 Drawing Sheets

(51) Int. Cl.
  *G06F 3/01* (2006.01)
  *G06F 3/0488* (2013.01)
(52) U.S. Cl.
  CPC ......... *G06F 3/017* (2013.01); *H04N 5/23203* (2013.01); *H04N 5/23206* (2013.01); *H04N 5/23212* (2013.01); *H04N 5/23293* (2013.01); *H04N 5/232127* (2018.08); *H04N 5/232933* (2018.08); *G06F 3/0488* (2013.01); *H04N 5/23219* (2013.01)
(58) Field of Classification Search
  CPC ........... H04N 5/232; G06F 1/163; G06F 1/16; G06F 3/013; G06F 3/017; G06F 3/0488
  USPC ..................................... 348/333.01
  See application file for complete search history.

(56) References Cited

U.S. PATENT DOCUMENTS

| | | |
|---|---|---|
| 2010/0118141 A1 | 5/2010 | Bouchon-Meunier et al. |
| 2011/0085073 A1 | 4/2011 | Park |
| 2011/0249150 A1* | 10/2011 | Shintani ............. H04N 5/23212 348/240.3 |
| 2012/0054655 A1 | 3/2012 | Kang et al. |
| 2013/0271618 A1 | 10/2013 | Koryakovitsky et al. |
| 2013/0293685 A1 | 11/2013 | Schick et al. |
| 2014/0045481 A1* | 2/2014 | Fraley ............... H04W 52/0258 455/418 |
| 2014/0063278 A1 | 3/2014 | Voss et al. |
| 2014/0289323 A1 | 9/2014 | Kutaragi et al. |
| 2015/0138427 A1* | 5/2015 | Kennedy ............ H04N 5/23206 348/345 |
| 2015/0172531 A1* | 6/2015 | Ikeda ................. H04N 5/23206 348/207.11 |
| 2016/0065831 A1* | 3/2016 | Howard ............. H04N 5/23206 348/211.2 |

OTHER PUBLICATIONS

Written Opinion dated Sep. 13, 2016, issued by the International Searching Authority in counterpart International Patent Application No. PCT/KR2016/005921 (PCT/ISA/237.

* cited by examiner

WEARABLE DEVICE FOR CHANGING FOCAL POINT OF CAMERA AND METHOD THEREOF

TECHNICAL FIELD

The present disclosure relates to methods and apparatuses for receiving a user input for changing focus of a camera that photographs a target object and requesting the camera to change focus.

BACKGROUND ART

In the case of capturing images or moving pictures by using a camera, a user wants to clearly see a desired portion of an image or moving picture. Along with the recent popularization of high performance cameras, such as digital single lens reflex (DSLR) cameras, users' demand for focusing functions, such as an out-focusing effect, has increased.

When a user photographs a target object while viewing an image thereof, a focusing function may be used via an interface of a camera. However, if a target object is the user himself/herself, it is difficult to control focus of a camera and take a picture.

DISCLOSURE OF INVENTION

Solution to Problem

Provided are methods of changing focus of a camera by using a wearable device.

Provided are wearable devices that receive a user input for changing focus of a camera that is photographing a target object and request the camera to change focus based on the user input.

Advantageous Effects of Invention

According to an embodiment, a user can change focus of the camera performed via the wearable device in the case where the user capturing an image by using the camera is the target object.

BEST MODE FOR CARRYING OUT THE INVENTION

Figure 1:
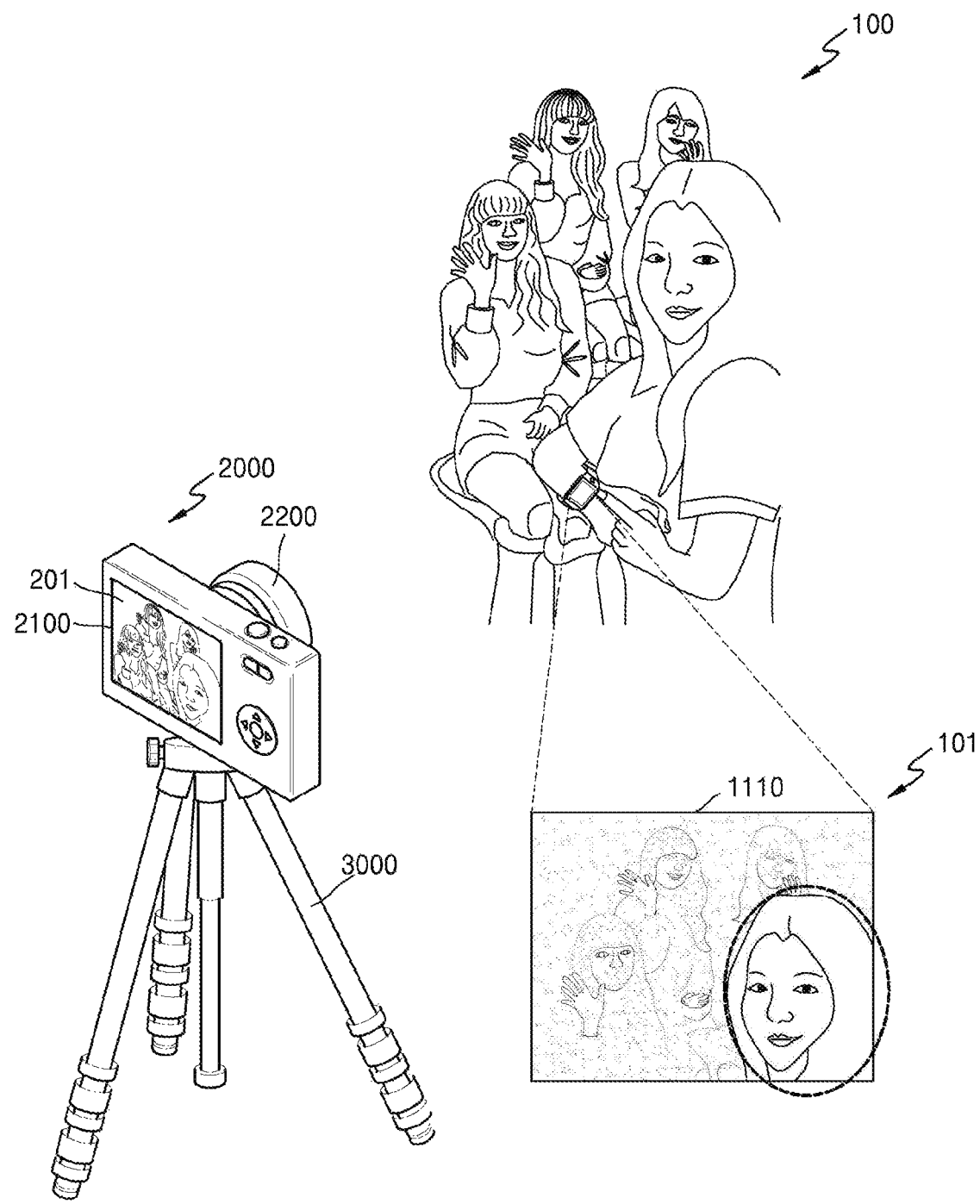
FIG. 1 is a diagram showing a method of changing focus of a camera with regard to a target object by using a watch-type wearable device according to an embodiment.

According to an aspect of an embodiment, a method used by a wearable device changes focus of a camera photographing a target object includes receiving an target object image, which is displayed on a preview display of the camera and includes at least one target object to be photographed by the camera, from the camera; displaying the received target object image on a display of the wearable device in conjunction with the camera; receiving a first user input for changing focus of the camera to a particular point of the target object image displayed on the display; and requesting the camera to change focus based on the first user input.

Furthermore, the display may include a touch screen for receiving a touch input, wherein, in the receiving of the first user input, a touch input of a user for selecting a location to change focus of the camera to in the target object image displayed on the display may be received.

Furthermore, the wearable device may include a touch interface device for receiving a touch input, wherein, in the receiving of the first user input, a user input for selecting a location to change focus of the camera to in the target object image displayed on the display may be received by using the touch interface device.

Furthermore, the wearable device may include an eye tracker for tracking movements of the eyes of a user using the wearable device, wherein, in the receiving of the first user input, a movement of the eyes of the user for selecting a location to change focus of the camera to in the target object image displayed on the display may be recognized via the eye tracker.

Furthermore, the receiving of the first user input may include determining whether the eyes of the user stay at the point to which focus of the camera is to be changed to for a pre-set time period.

Furthermore, the receiving of the first user input may include determining whether the eyes of the user blink for a pre-set number of times while the eyes of the user stay at the point to which focus of the camera is to be changed to.

The method may further include receiving a second user input for requesting the camera to photograph the target object based on focus changed according to the request.

Furthermore, the wearable device may include a touch screen for receiving a touch input, and, in the receiving of the second user input, a user input that touches a particular area on the touch screen may be received.

Furthermore, the wearable device may include a spatial gesture recognizing device for recognizing a spatial gesture of a user using the wearable device, and, in the receiving of the second user input, a user input for selecting a location to change focus of the camera to in the target object image displayed on the display may be received via the spatial gesture recognizing device.

According to an aspect of another embodiment, a wearable device that changes focus of a camera photographing a target object, the wearable device includes a communicator, which receives an target object image, which is displayed on a preview display of the camera and includes at least one target object to be photographed by the camera, from the camera; a display, which displays the target object image; a user input unit, which receives a first user input for changing focus of the camera to a particular point of the target object image displayed on the display; and a controller, which synchronizes the target object image displayed on the display with an object displayed on a preview display of the camera and requests the camera to change focus to a particular point of the target object image based on the first user input.

Furthermore, in order to photograph a target object, the communicator may receive data regarding an image of the target object to be photographed by the camera from the camera by using short-range wireless communication signals.

Furthermore, the user input unit may receive a touch input for selecting a location to change focus of the camera to in the target object image displayed on the display.

Furthermore, the user input unit may be a touch interface device for receiving a touch input for selecting a location to change focus of the camera to in the target object image displayed on the display.

Furthermore, the user input unit may be an eye tracker for tracking movements of the eyes of the user regarding a particular point to change focus of the camera to in the target object image displayed on the display, and the controller may change focus of the camera based on the particular point of the target object image recognized by the eye tracker.

Furthermore, the eye tracker may determine whether the eyes of the user stay at the point to which focus of the camera is to be changed to for a pre-set time period, and the controller may change focus of the camera based on the particular point at which the eyes of the user stay for the pre-set time period.

Furthermore, the eye tracker may determine whether the eyes of the user blink for a pre-set number of times while the eyes of the user stay at the particular point to which focus of the camera is to be changed to.

Furthermore, the user input unit may receive a second user input for requesting the camera to photograph the target object based on focus of the camera changed based on the first user input, and the controller may control the camera to photograph the target object based on the second user input.

Furthermore, the wearable device may further include a spatial gesture recognizing device for recognizing a spatial gesture of a user using the wearable device, wherein the spatial gesture recognizing unit may receive a user input for selecting a location to change focus of the camera to in the target object image displayed on the display.

According to an aspect of another embodiment, there is provided a non-transitory computer readable recording medium having recorded thereon a computer program for implementing the method of claim.

MODE FOR THE INVENTION

This application claims the benefit of Korean Patent Application No. 10-2015-0082572, filed on Jun. 11, 2015, in the Korean Intellectual Property Office, the disclosure of which is incorporated herein in its entirety by reference.

Hereinafter, embodiments will be described more fully with reference to the accompanying drawings. These embodiments may, however, be embodied in many different forms and should not be construed as limited to the embodiments set forth herein. Rather, the embodiments are provided so that this disclosure will be thorough and complete, and will fully convey the scope of the inventive concept to those skilled in the art. In drawings, certain elements are omitted for clarity, and like elements denote like reference numerals throughout the specification.

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram showing a method of changing focus of a camera 2000 with regard a target object 100 by using a wearable device 1000 according to an embodiment.

As shown in FIG. 1, the wearable device 1000 according to an embodiment may receive a user input for changing focus of the camera 2000 that is photographing the target object 100. The wearable device 1000 may be a computing device that may be worn on a body part of a user included in the target object 100 to be photographed by the camera 2000. The wearable device 1000 may include a display 1110. According to an embodiment, the wearable device 1000 may be a watch-type wearable device, an eyeglass-type wearable device, or a hair band-type wearable device having communication function and data processing function, but is not limited thereto. The wearable device 1000 may be connected to the camera 2000 via a wire or wirelessly. The wearable device 1000 may transmit a short-range wireless communication signal to the camera 2000, and a target object image 201 displayed on a preview display 2100 of the camera 2000 and a target object image 101 displayed on the display 1110 of the wearable device 1000 may be synchronized with each other. According to an embodiment, the wearable device 1000 may be paired with the camera 2000 via at least one of short-range wireless communication protocols including Bluetooth protocol, Bluetooth Low Energy (BLE) protocol, near field communication (NFC) protocol, radio frequency identification (RFID) protocol, and Wi-Fi protocol.

The camera 2000 may include the preview display 2100 and a lens 2200. Furthermore, according to an embodiment, the camera 2000 may further include an image sensor (not shown), a memory (not shown), and a communication module (not shown). The lens 2200 may capture an image regarding the target object 100 and transmit the image to the image sensor (not shown), and the preview display 2100 may display the target object image 201 regarding the target object 100 processed by the image sensor. The camera 2000 may have auto-focusing function for automatically setting focus at the target object 100 or manual-focusing function for setting or changing focus by receiving a user input for setting or changing focus. The camera 2000 may operate in conjunction with external devices around the camera 2000 via a short-range wireless communication signal. According to an embodiment, the camera 2000 may be paired with the wearable device 1000 by using a short-range wireless communication signal, such as a Bluetooth signal or a Wi-Fi signal. The camera 2000 may transmit data regarding the target object image 201 that is captured via the lens 2200 and image-processed by the image sensor to the wearable device 1000. The camera 2000 may be mounted on a stand 3000, such as a tripod.

According to an embodiment, the wearable device 1000 may be synchronized with the camera 2000, receive image data regarding the target object 100 photographed by the camera 2000, and display an image corresponding to the image data on the display 1110. The target object image 101 displayed on the display 1110 may be synchronized with the image 201 displayed on the preview display 2100 of the camera 2000. Furthermore, the wearable device 1000 may receive a user input for setting focus at or changing focus to a particular point of the target object image 101 displayed on the display 1110. According to an embodiment, the display 1110 may be a touch screen and may receive a touch input of a user for changing focus of the camera 2000 to a particular point of the target object image 101. The wearable device 1000 may receive a user input for changing focus of the camera 2000 to a particular point of the target object image 101 and transmit data regarding changed focus based on the received user input to the camera 2000. The camera 2000 may change focus based on the data regarding changed focus received from the wearable device 1000.

According to the embodiment of FIG. 1, a method of changing focus of the camera 2000 is performed via the wearable device 1000 in the case where a user capturing an image by using the camera 2000 is the target object 100. In detail, the wearable device 1000 and the camera 2000 may synchronize displayed images of the target object 100 via short-range wireless communication, and the user may change focus of the camera 2000 by inputting a point to change focus via a touch input while viewing the target object image 101 of the target object 100 being photographed via the camera 2000 on the display 1110 of the wearable device 1000. Furthermore, the wearable device 1000 may control the camera 2000 to capture an image based on the changed focus.

Therefore, according to an embodiment, when a user becomes the target object 100, an image focused to a point desired by the user may be provided.

Figure 2:
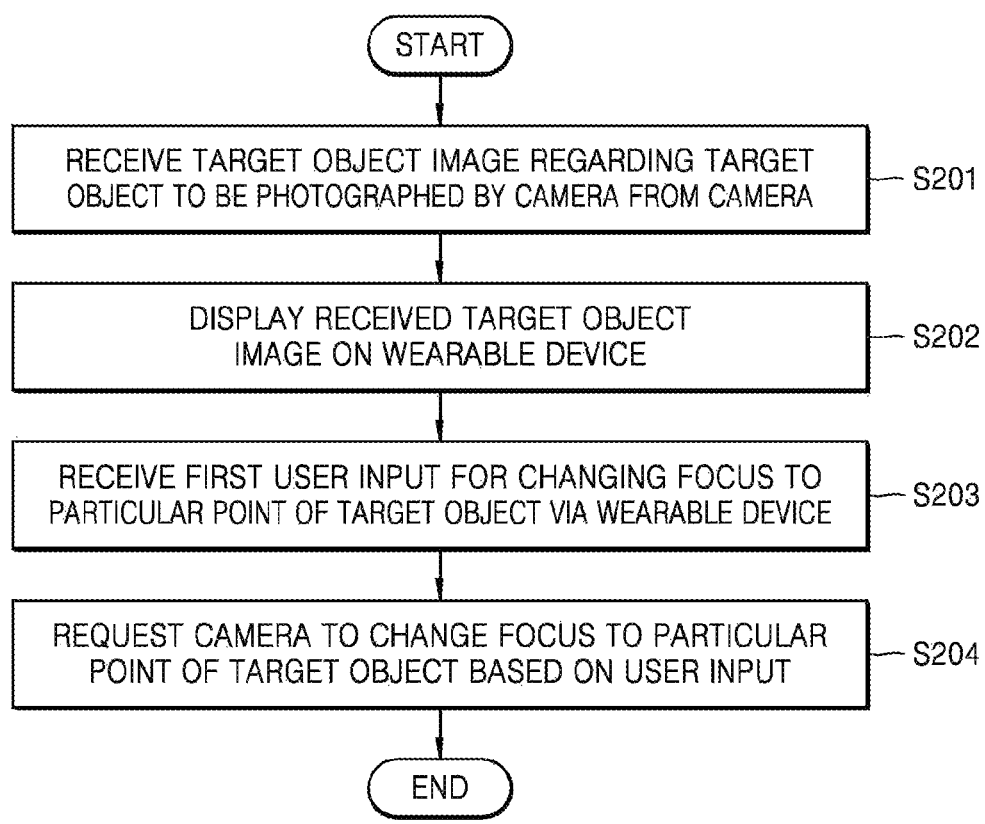
FIG. 2 is a flowchart of a method of changing focus of the camera with regard to the target object by using the watch-type wearable device, according to an embodiment.

FIG. 2 is a flowchart showing a method of changing focus of the camera 2000 regarding the target object 100 by using the wearable device 1000, according to an embodiment.

In operation S201, the wearable device 1000 receives an image of a target object to be photographed by the camera 2000 from the camera 2000. The wearable device 1000 may receive image data regarding the target object from the camera 2000 via a short-range wireless communication. According to an embodiment, the wearable device 1000 and the camera 2000 may be paired with each other via at least one of short-range wireless communication protocols, such as Bluetooth protocol, BLE protocol, NFC protocol, RFID protocol, and Wi-Fi protocol.

In operation S202, the wearable device 1000 displays the received image of the target object at a display of the wearable device 1000. According to an embodiment, the wearable device 1000 and the camera 2000 may be synchronized with each other, such that an image displayed at the display of the wearable device 1000 is identical to an image displayed at a display of the camera 2000.

In operation S203, a first user input for changing focus of the camera 2000 to a particular point of an image of the target object is received from the wearable device 1000. According to an embodiment, the first user input may be a user input corresponding to a touch at the particular point of the target object image 101 displayed on the wearable device 1000. According to another embodiment, the wearable device 1000 may include a touch interface device, and the first user input may be a user input for changing focus by applying a touch input or a swipe input to the touch interface device.

In operation S204, the wearable device 1000 requests the camera 2000 to change focus to the particular point based on the first user input. According to an embodiment, the wearable device 1000 may encode a focus change signal based on the first user input and transmit the encoded focus change signal to the camera 2000 via a short-range wireless communication. The camera 2000 may receive focus information regarding the target object 100 based on the first user input from the wearable device 1000. The camera 2000 may change focus regarding the target object 100 based on the received focus information.

Figure 3:
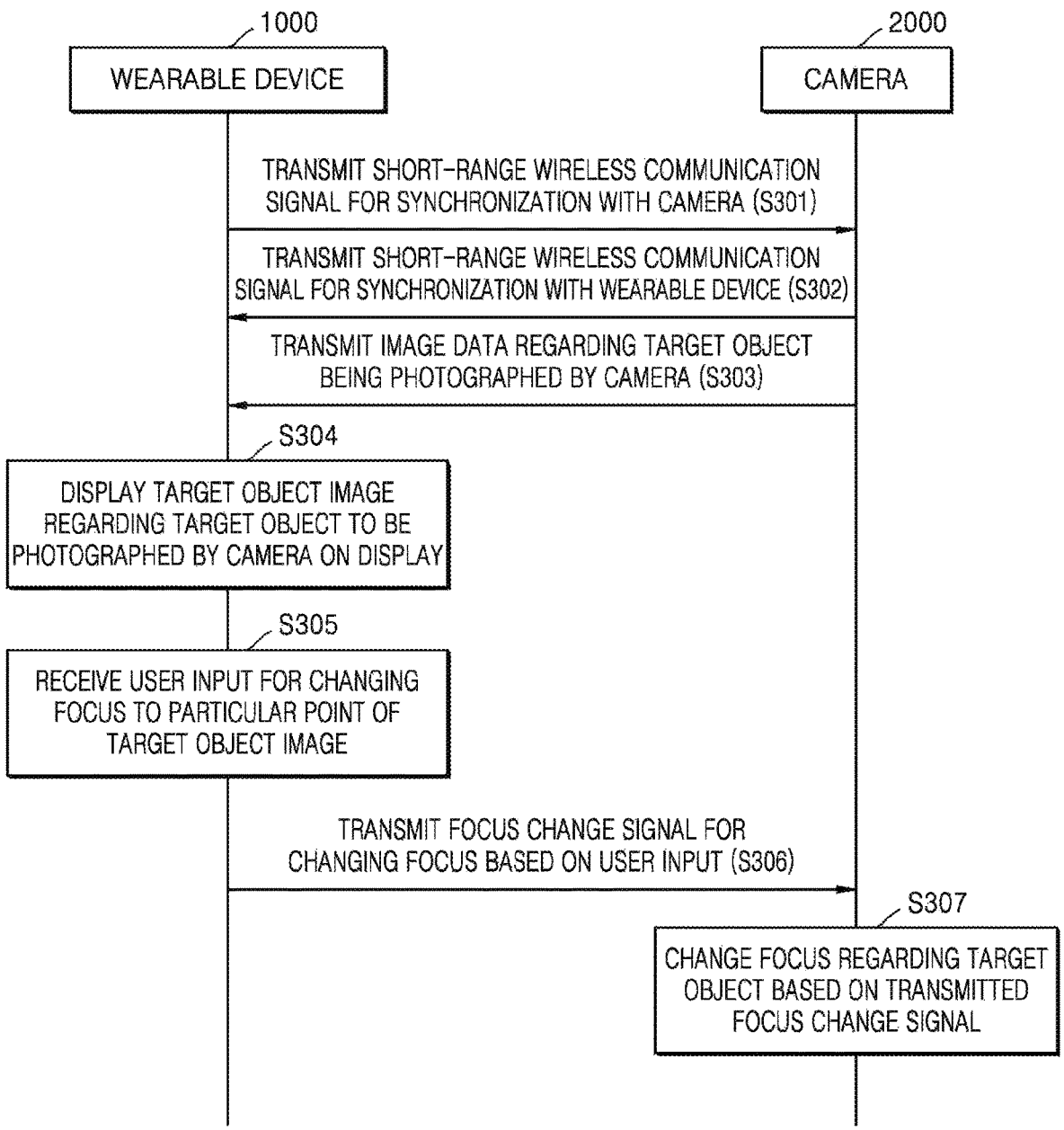
FIG. 3 is a flowchart of a method used by the watch-type wearable device to change focus of the camera on a particular point of the target object, according to an embodiment.

FIG. 3 is a flowchart showing a method by which the wearable device 1000 changes focus of the camera 2000 to a particular point of the target object 100, according to an embodiment.

In operation S301, the wearable device 1000 transmits a short-range wireless communication signal for synchronization with the camera 2000 to the camera 2000. In operation S302, the camera 2000 transmits a short-range wireless communication signal for synchronization with the wearable device 1000 to the wearable device 1000. According to an embodiment, short-range wireless communication signals exchanged between the wearable device 1000 and the camera 2000 may include Bluetooth signals, BLE signals, NFC signals, RFID signals, Wi-Fi signals, beacon signals, Zigbee signals, and ultra wideband (UWB) signals, but are not limited thereto. Furthermore, the wearable device 1000 and the camera 2000 may transmit not only short-range wireless communication signals, but also synchronization signals by using at least one of a wireless communication protocol using a cellular network provided by a mobile communication provider and a wire communication protocol using an optical cable, an UTP cable, or a coaxial cable.

In operations S301 and S302, the wearable device 1000 and the camera 2000 may be paired with each other for synchronization.

In operation S303, the camera 2000 transmits data regarding the target object image 101 regarding the target object 100 photographed via the lens 2200 (refer to FIG. 1) to the wearable device 1000. The data regarding the target object image 101 is data generated by forming an image of the target object 100 photographed by the lens 2200 of the camera 2000 at an image sensor and encoding the image and may be transmitted to the wearable device 1000 via a short-range wireless communication protocol.

In operation S304, the wearable device 1000 displays the target object image 101 regarding the target object 100 photographed by the camera 2000 on the display 1110. The target object image 101 regarding the target object 100 displayed on the display 1110 may be synchronized with the image 201 (refer to FIG. 1) displayed on the preview display 2100 of the camera 2000.

In operation S305, the wearable device 1000 receives a user input for changing focus to a particular point of the target object 100. According to an embodiment, the wearable device 1000 may include a touch screen arranged on the display 1110 and receive a user input corresponding to a touch at a particular point of the target object image 101 regarding the target object 100 displayed on the display 1110. According to another embodiment, the wearable device 1000 may include a touch interface device, where a user input for changing focus by operating the touch interface device may be received.

In operation S306, the wearable device 1000 may transmit a focus change signal to the camera 2000 based on the user input. According to an embodiment, the wearable device 1000 may encode a user input for changing focus to a particular point of the target object 100 to an electric signal for transmission via a short-range wireless communication protocol. The wearable device 1000 may transmit an encoded electric signal to the camera 2000 via at least one of short-range wireless communication protocols including Bluetooth protocol, BLE protocol, NFC protocol, RFID protocol, Wi-Fi protocol, beacon protocol, Zigbee protocol, and UWB protocol.

In operation S307, the camera 2000 changes focus regarding the target object 100 based on the transmitted focus change signal.

Figure 4A:
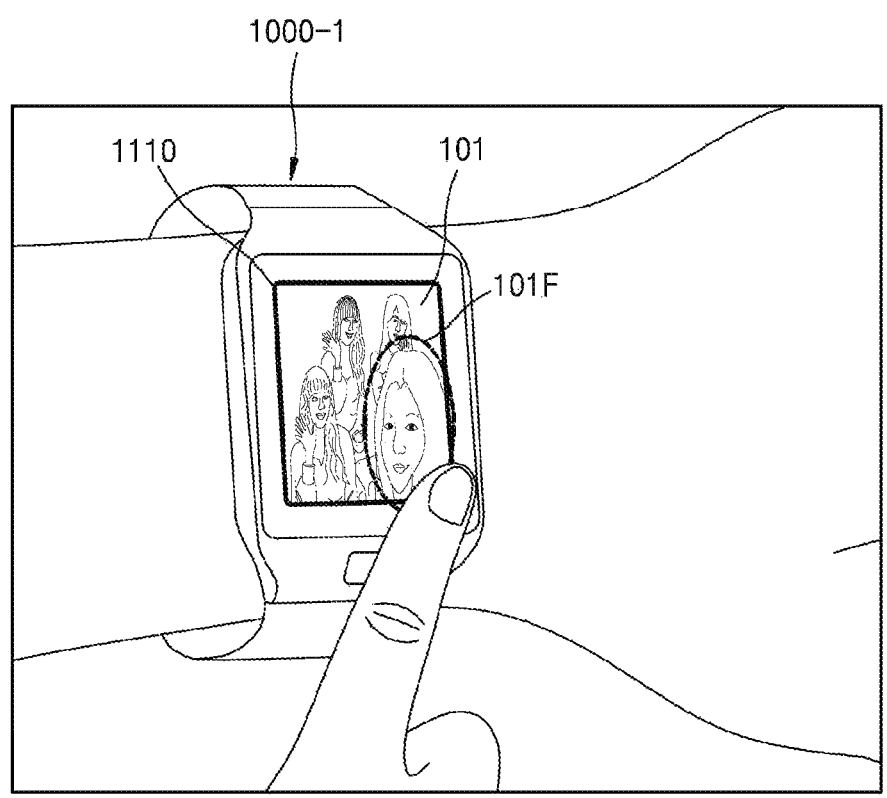
FIG. 4A is a diagram showing a watch-type wearable device that receives a user input for changing focus of the camera with regard the target object, according to an embodiment.
Figure 4B:
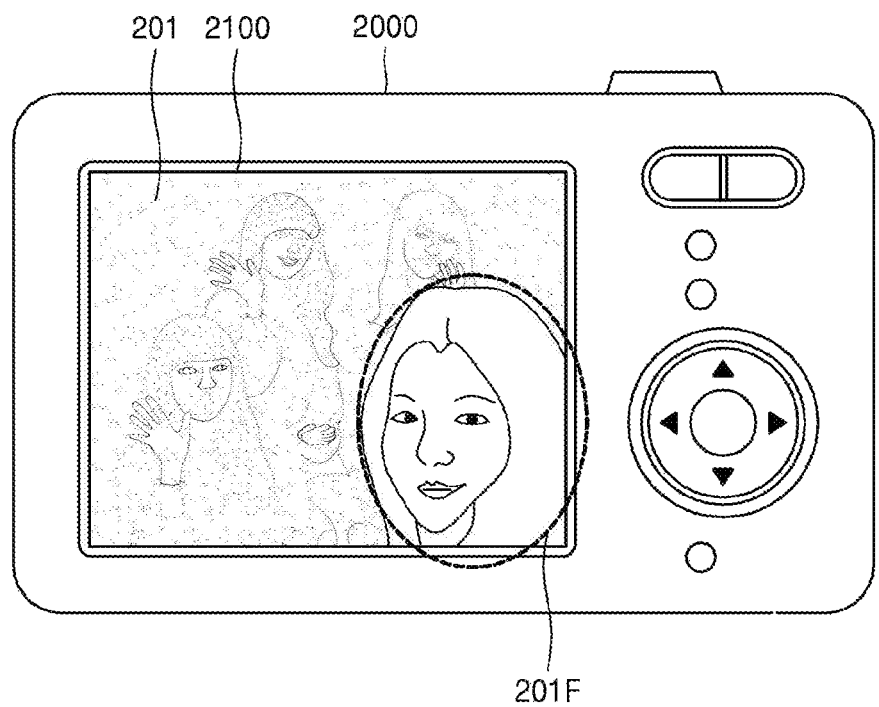
FIG. 4B is a diagram showing the camera with changed focus with regard the target object, according to an embodiment.

FIG. 4A is a diagram showing a wearable device 1000-1 that receives a user input for changing focus of the camera 2000 regarding the target object 100, according to an embodiment, and FIG. 4B is a diagram showing the camera 2000 with changed focus regarding the target object 100, according to an embodiment.

Referring to FIG. 4A, the wearable device 1000-1 may be a computing device that may be worn on a body part of a user. According to an embodiment, the wearable device 1000-1 may be a watch-type computing device that may be worn on a wrist of a user and has communication function and data processing function. The wearable device 1000-1 may include the display 1110, where the display 1110 includes a touch screen panel arranged thereon. The target object image 101 regarding the target object 100 being photographed by the camera 2000 may be displayed on the display 1110. The wearable device 1000-1 may receive a user input for setting focus at or changing focus to a particular point of the target object image 101 regarding the target object 100 displayed on the display 1110. According to an embodiment, the touch screen may receive a touch input corresponding to a touch at a particular point of the target object image 101 regarding the target object 100.

Referring to FIG. 4B, the camera 2000 may include the preview display 2100. The preview display 2100 may display the image 201 regarding the target object 100 being photographed via the lens 2200 (refer to FIG. 1) of the camera 2000. The camera 2000 may be synchronized with the wearable device 1000-1 by using short-range wireless communication signals and may set or change focus with respect to the target object image 201 regarding the target object 100 based on a user input received by the wearable device 1000-1.

In the embodiment shown in FIG. 4A, the target object 100 may include four persons, and the wearable device 1000-1 may receive a user's touch input for changing focus to the rightmost person of the four persons displayed on the display 1110. In the embodiment shown in FIG. 4B, the camera 2000 may change focus 201F to the rightmost person in the target object image 201 regarding the target object 100 displayed on the preview display 2100 based on the user input received by the wearable device 1000-1. Therefore, only the rightmost person in the image 201 may be clearly shown, whereas the remaining of the target object 100, that is, the other three persons may be blurred. In the embodiments shown in FIGS. 4A and 4B, if a user becomes a target object, the user may touch a particular point to set focus at in the image 101 regarding the target object displayed on the wearable device 1000-1 and control the camera 2000 to capture an image based on the changed focus 201F, and thus, an image as desired by the user may be obtained.

Figure 5:
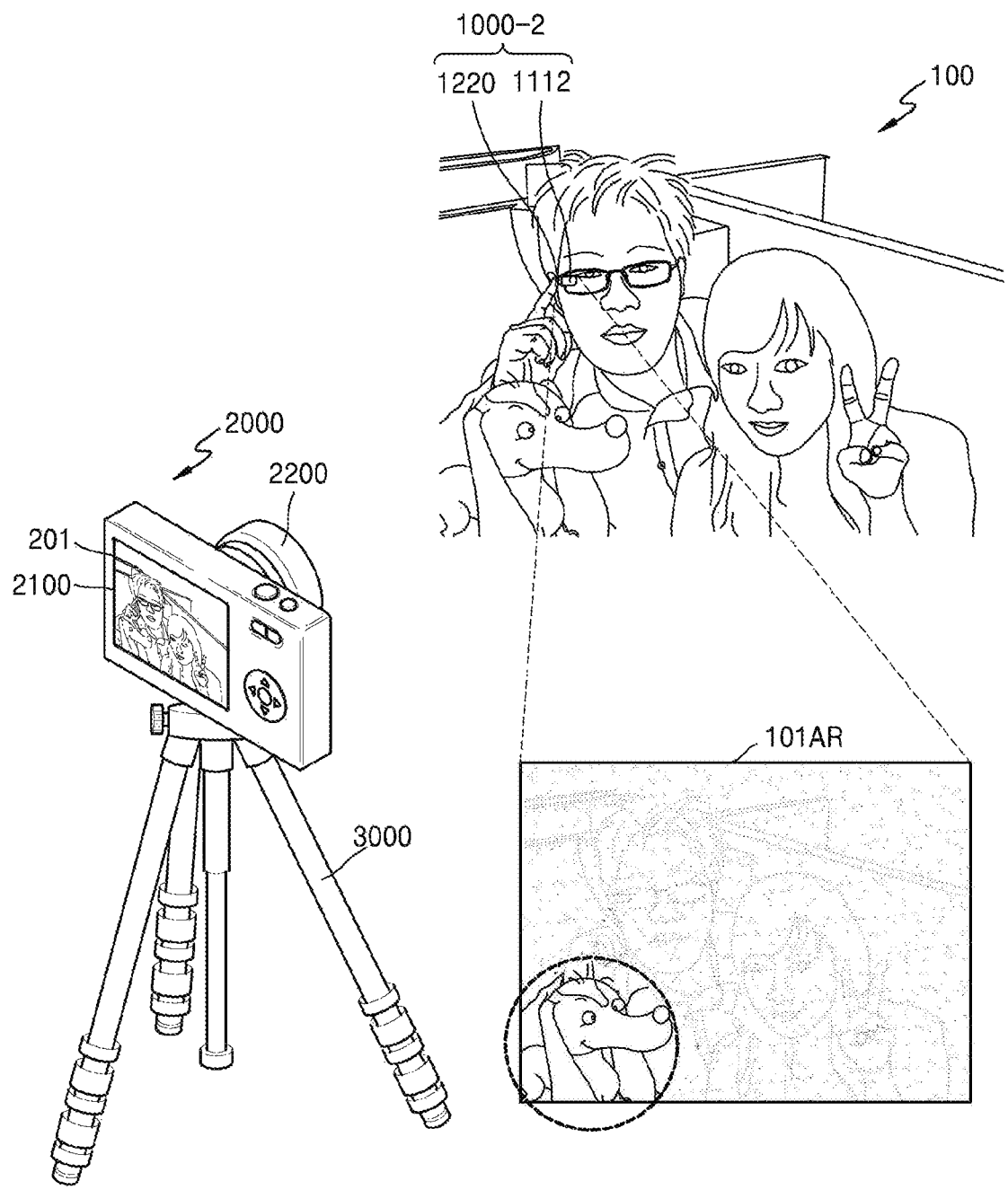
FIG. 5 is a diagram showing a method of changing focus of the camera with regard to a target object by using an eyeglass-type wearable device, according to an embodiment.

FIG. 5 is a diagram showing a method of changing focus of the camera 2000 regarding the target object 100 by using a wearable device 1000-2, according to an embodiment.

Referring to FIG. 5, the wearable device 1000-2 may be an eyeglass-type computing device that may be worn on the face of a user and has communication function and data processing function. The wearable device 1000-2 may include a head-up display (HUD) 1112 and a touch interface device 1220. The wearable device 1000-2 may further include a camera (not shown) and a microphone (not shown). The camera 2000 may be synchronized with the wearable device 1000-2 via a short-range wireless communication, where the camera 2000 may encode an image regarding the target object 100 being photographed by the camera 2000 and transmit the encoded image to the wearable device 1000-2. The HUD 1112 may display an image regarding the target object 100 being photographed by the camera 2000 as an augmented reality image 101AR, and a user may view an image regarding the target object 100 being currently photographed by the camera 2000 via the augmented reality image 101AR. The augmented reality image 101AR may provide visual effects including the an image identical to the target object image 201 regarding the target object 100 being photographed by the camera 2000 to the user.

In the embodiment shown in FIG. 5, a user wearing the wearable device 1000-2 may become a part of the target object 100 being photographed by the camera 2000 and may set focus at or change focus to a desired point by viewing the augmented reality image 101AR displayed by the HUD 1112 and operating the touch interface device 1220. A method of setting or changing focus regarding the target object 100 by operating the touch interface device 1220 will be described below with reference to FIGS. 6A and 6B.

Figure 6A:
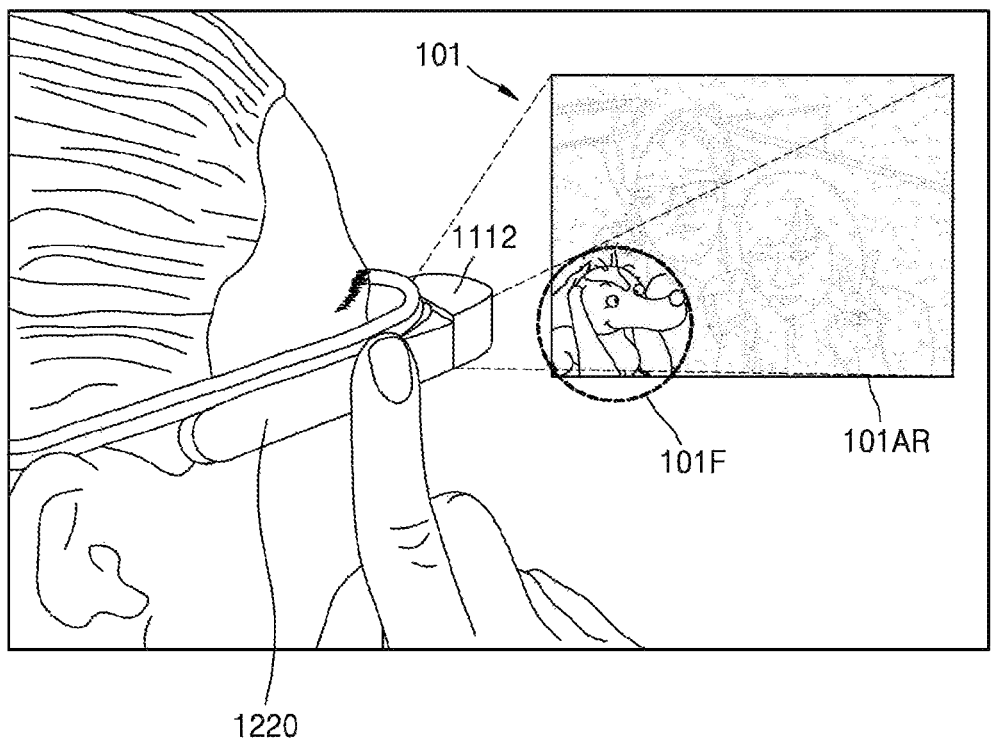
FIGS. 6A and 6B are diagrams showing a method of changing focus of the camera with regard to a target object by using the eyeglass-type wearable device, according to an embodiment.
Figure 6B:
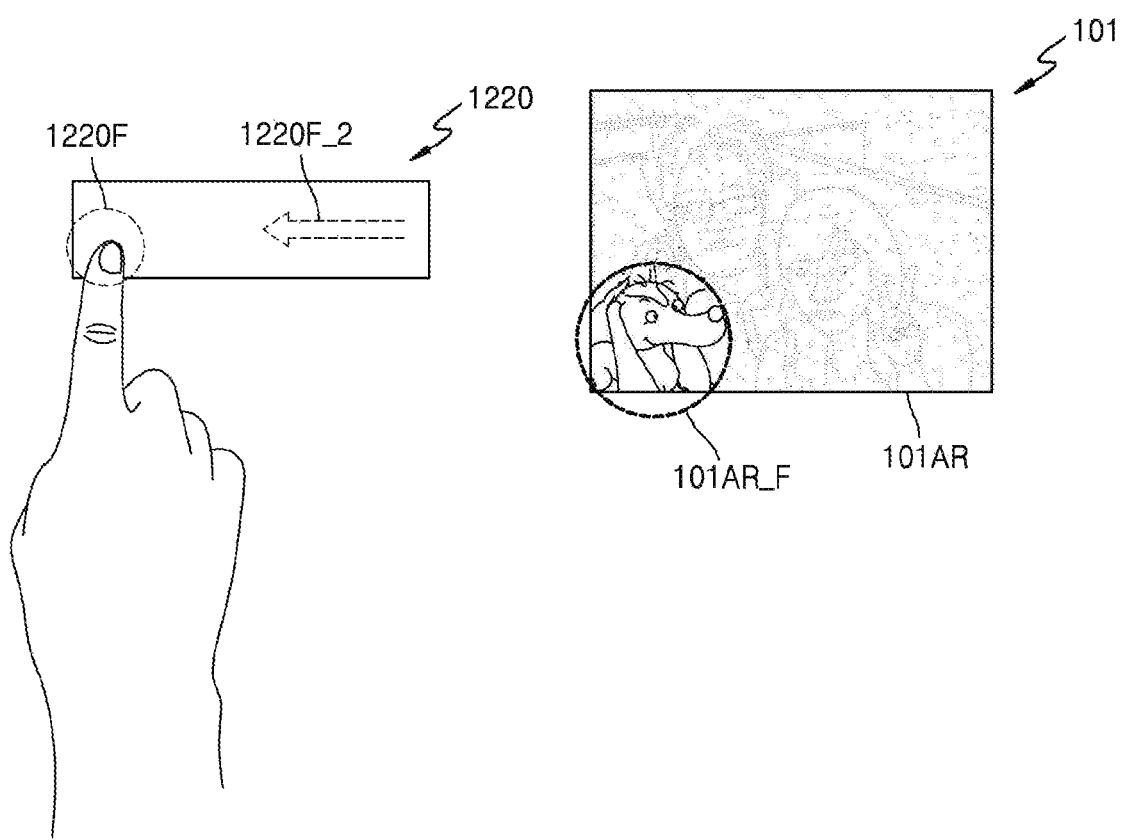

FIGS. 6A and 6B are diagrams showing a method of changing focus of the camera 2000 regarding the target object 100 by using the touch interface device 1220 of the wearable device 1000-2, according to an embodiment.

Referring to FIG. 6A, the wearable device 1000-2 may include the HUD 1112 arranged over and apart from an eyeglass lens and the touch interface device 1220 arranged to contact a temple. The HUD 1112 may display the augmented reality image 101AR regarding the target object 100 being photographed by the camera 2000 (refer to FIG. 5). A user may view the augmented reality image 101AR and select a point of the target object 100 to set focus at or change focus to by operating the touch interface device 1220.

Referring to FIG. 6B, the touch interface device 1220 may be a touch pad capable of receiving a touch input and a swipe input of a user. The wearable device 1000-2 may display the augmented reality image 101AR via the HUD 1112 and receive user inputs 1220F and 1220F2 for changing focus by using the touch interface device 1220. According to an embodiment, the touch interface device 1220 may receive a touch input 1220F for changing focus by touching a particular point. Furthermore, the touch interface device 1220 may receive a swipe input 1220F_2 for changing focus from a first point to a second point. The wearable device 1000-2 may change focus to a point of a target object corresponding to the particular point that is touched or swiped to. A focus changing point 101AR_F may be displayed on the augmented reality image 101AR. A target object located inside the focus changing point 101AR_F on the augmented reality image 101AR may be clearly shown, and the remaining of the augmented reality image 101AR may be blurred.

Figure 7:
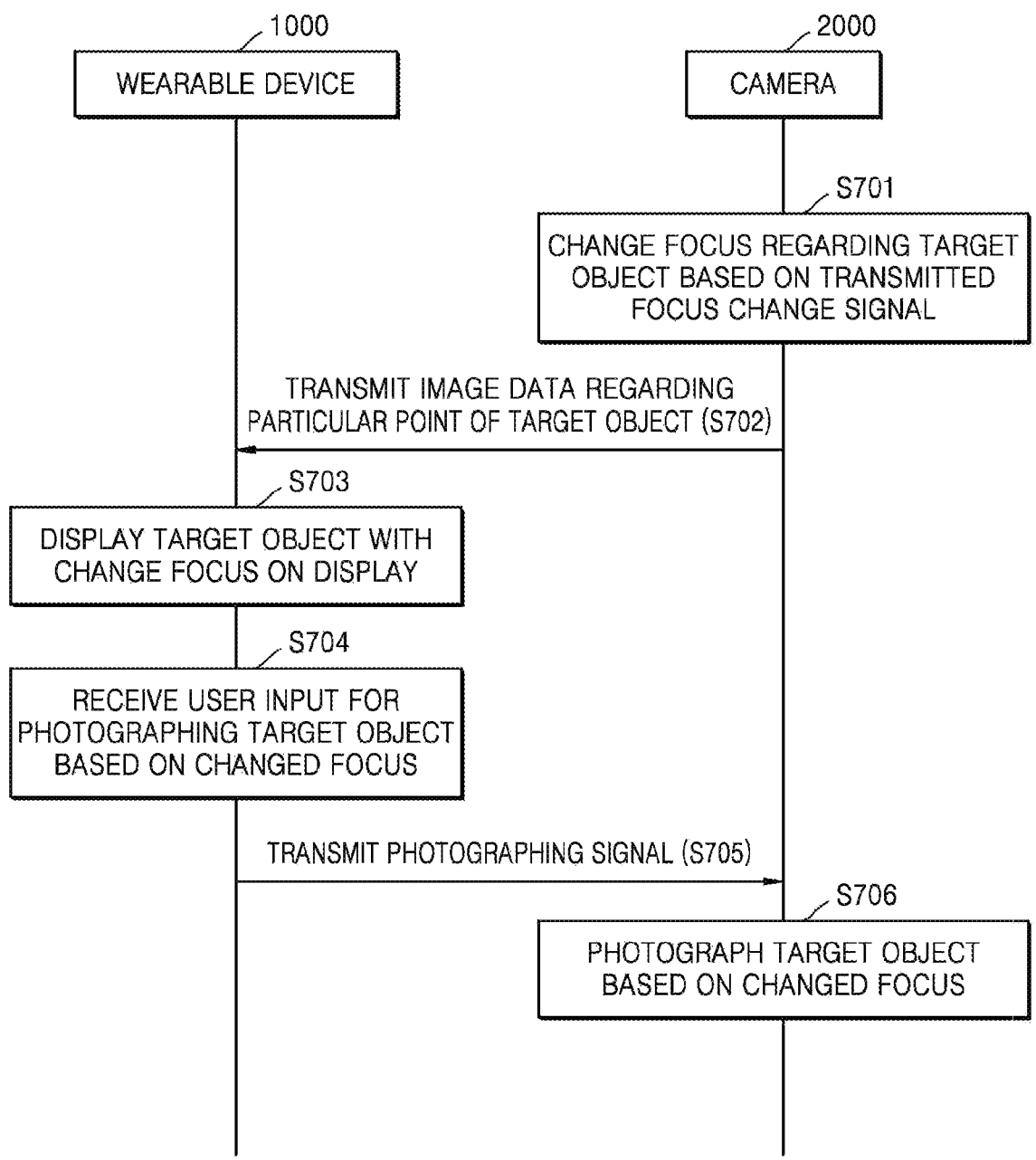
FIG. 7 is a flowchart of a method of photographing a target object based on focus changed by using the eyeglass-type wearable device, according to an embodiment.

FIG. 7 is a flowchart showing a method of photographing the target object 100 based on focus changed by using the wearable device 1000, according to an embodiment.

In operation S701, the camera 2000 changes focus regarding the target object 100 based on a focus change signal transmitted to the camera 2000. The operation S701 may be an operation performed by the camera 2000 after the signal transmitting operation (the operation S306) for changing focus based on a user input as shown in FIG. 3. The camera 2000 may receive a user input for changing focus to a particular point of an image regarding the target object 100 from the wearable device 1000 via a short-range wireless communication protocol and may change focus to the particular point regarding the target object 100 based on the received user input. The camera 2000 may clearly display the particular point of the target object 100 based on the user input and may blur the remaining of the target object 100.

In operation S702, the camera 2000 transmits image data regarding focus changed to the particular point of the image regarding the target object 100 to the wearable device 1000. According to an embodiment, the camera 2000 may transmit image data including information regarding changed focus to the wearable device 1000 via any one of various short-range wireless communication protocols, e.g., Bluetooth protocol, BLE protocol, NFC protocol, RFID protocol, Wi-Fi protocol, beacon protocol, zigbee protocol, and UWB protocol.

In operation S703, the wearable device 1000 displays an image regarding the target object 100 with changed focus on the display 1110 (refer to FIG. 1). According to an embodiment, in the image regarding the target object 100 displayed on the display 1110, a point corresponding to the changed focus is clearly displayed, whereas the remaining of the image regarding the target object 100 may be blurred.

In operation S704, the wearable device 1000 receives a user input for photographing the target object 100 based on the changed focus. According to an embodiment, the wearable device 1000 may include a touch screen that receives a touch input from a user and is arranged on the display 1110, where the touch screen may display an image capture button user interface (UI) for obtaining a still image regarding a target object or capturing moving pictures and storing in a memory.

In operation S705, the wearable device 1000 transmits a photographing signal for requesting the camera 2000 to photograph the target object 100 to the camera 2000. According to an embodiment, the wearable device 1000 may encode a photographing signal into an electric signal, such that the photographing signal may be transmitted to the camera 2000 via a short-range wireless communication protocol. The wearable device 1000 may transmit the encoded photographing signal to the camera 2000 via any one of Bluetooth protocol, BLE protocol, NFC protocol, RFID protocol, Wi-Fi protocol, beacon protocol, zigbee protocol, and UWB protocol.

In operation S706, the camera 2000 photographs the target object 100 based on the changed focus.

Figure 8A:
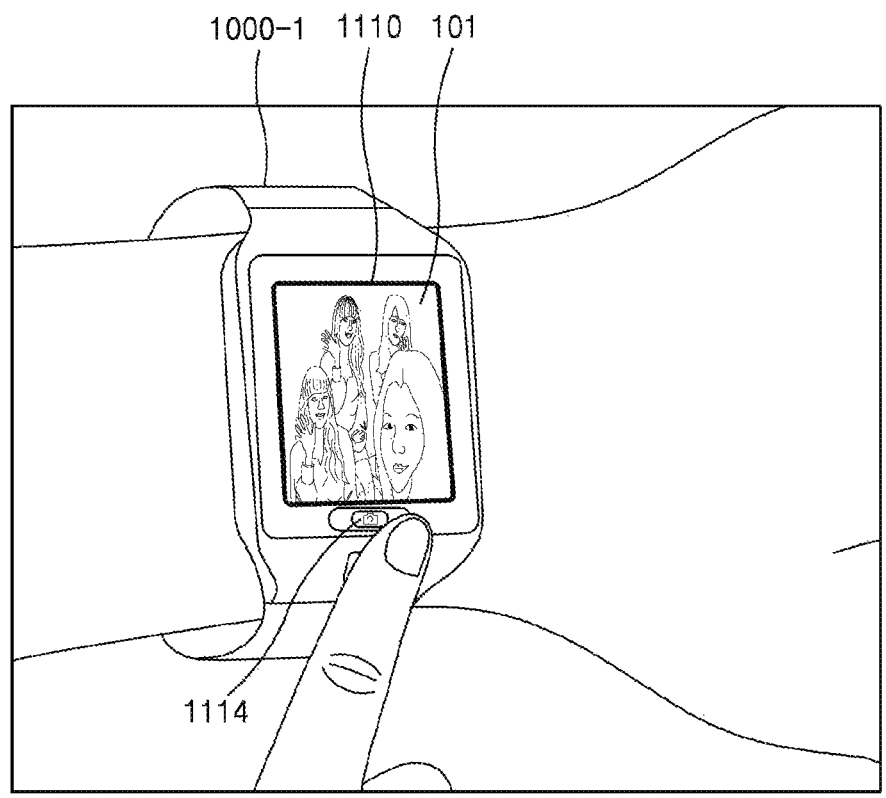
FIGS. 8A and 8B are diagrams showing methods of photographing a target object based on focus changed by using wearable devices, according to embodiments.
Figure 8B:
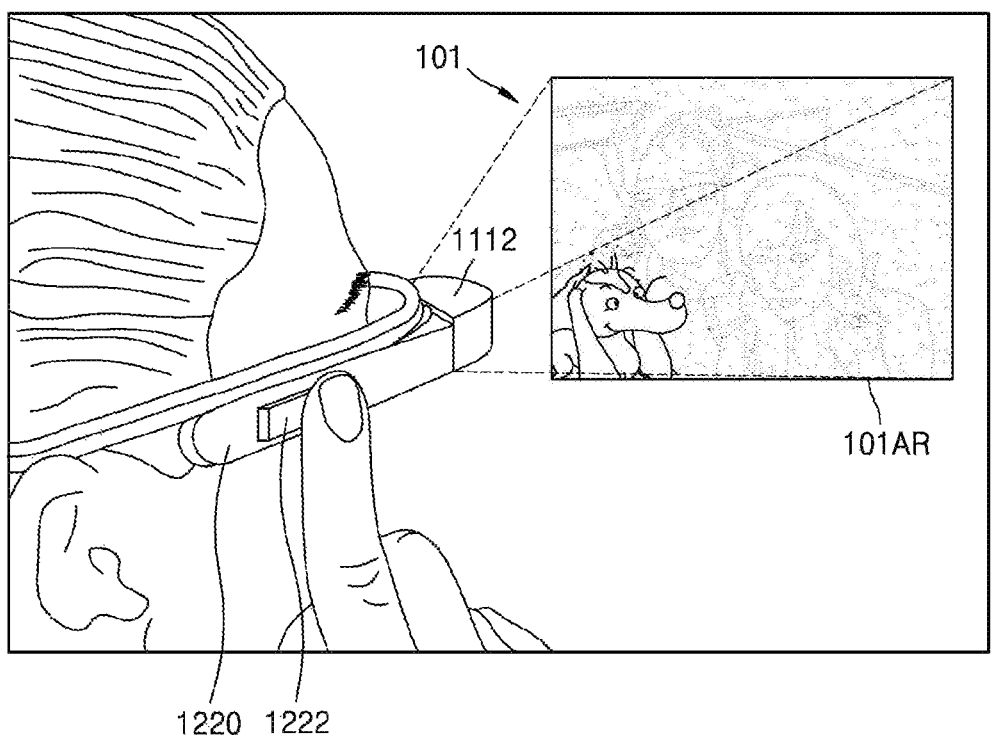

FIGS. 8A and 8B are diagrams showing methods of photographing a target object based on focus changed by using the wearable device 1000-1 and the wearable device 1000-2, according to embodiments.

Referring to FIG. 8A, the wearable device 1000-1 may include the display 1110 and a touch screen arranged on the display 1110. The display 1110 may display the image 101 regarding the target object 100. The display 1110 may display a photographing button GUI 1114. The wearable device 1000-1 may receive a user input that touches the photographing button GUI 1114 displayed on the display 1110. If the wearable device 1000-1 receives a user input that touches the photographing button GUI 1114, the wearable device 1000-1 may transmit a photographing request signal to the camera 2000.

Referring to FIG. 8B, the wearable device 1002 may include the HUD 1112 and the touch interface device 1220. According to an embodiment, the wearable device 1000-2 may further include a photographing button 1222. The photographing button 1222 may be a physical button that contacts the touch interface device 1220 and protrudes from the touch interface device 1220 to a certain height, but is not limited thereto. The photographing button 1222 may be a concave button on a surface of the touch interface device 1220 or a graphic user interface (GUI) capable of receiving a touch input.

The HUD 1112 may display the target object image 101 received from the camera 2000 as the augmented reality image 101AR. After a user views the target object image 101 and sets or changes focus, the photographing button 1222 may receive a user input that instructs to photograph a target object based on the changed focus. If a user input is received via the photographing button 1222, the wearable device 1002 may transmit a photographing request signal to the camera 2000.

Figure 9:
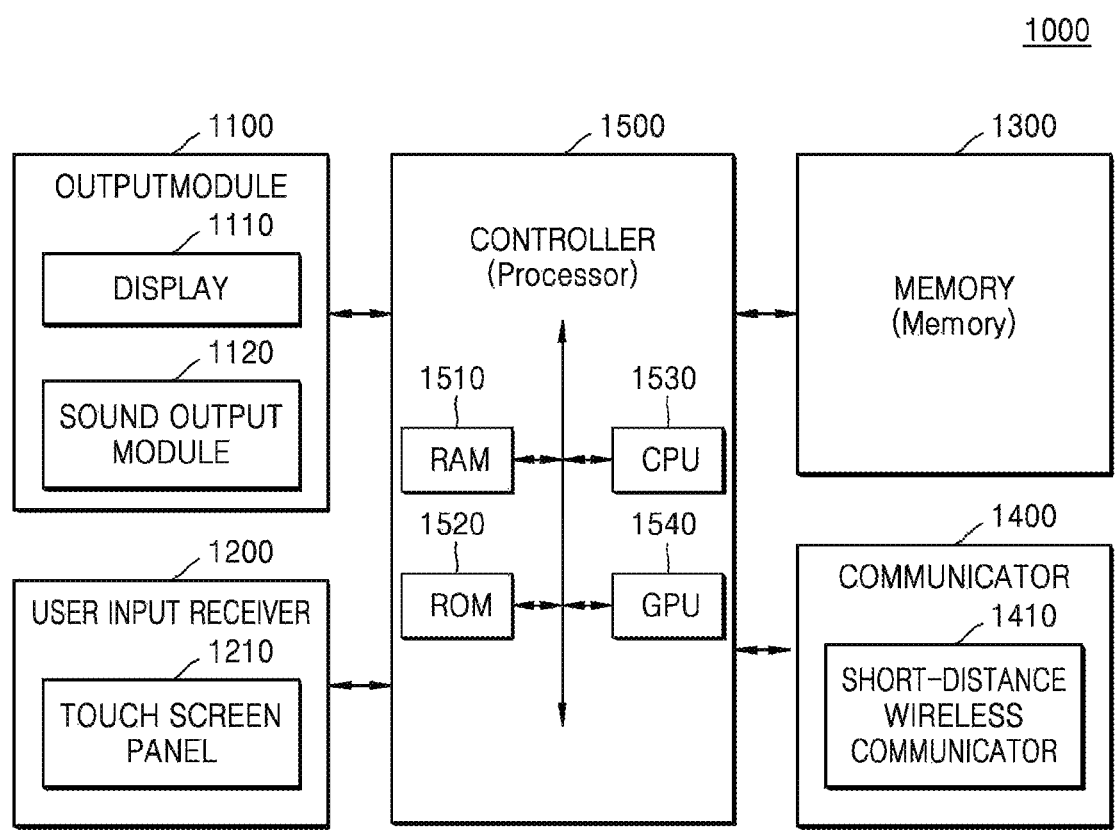
FIGS. 9 through 11 are block diagram showing wearable devices according to embodiments.

FIG. 9 is a block diagram showing a configuration of the wearable device 1000 according to an embodiment. The wearable device 1000 may be any one of the wearable device 1000 shown in FIG. 1, the wearable device 1000-1 shown in FIG. 4A, and the wearable device 1000-2 shown in FIG. 5. The wearable device 1000 may be a computing device that may be worn on a body part of a user. According to an embodiment, the wearable device 1000 may be a watch-type wearable device, an eyeglass-type wearable device, a head-mounted display (HMD) device, or a hair band-type wearable device having communication function and data processing function, but is not limited thereto.

Referring to FIG. 9, the wearable device 1000 may include at least one of an output module 1100, a user input receiver 1200, a memory 1300, a communicator 1400, and a controller 1500.

The output module 1100 may include the display 1110 and a sound output module 1120. The display 1110 may include a display panel and a controller that controls the display panel. The display panel may be embodied as one of various types of display panels, such as a liquid crystal display (LCD) panel, an organic light-emitting diode (OLED) panel, an active-matrix organic light-emitting diode (AM-OLED) panel, and a plasma display panel (PDP) panel. The display panel may be embodied to be flexible, transparent, or wearable. The display 1110 may display an image of a target object that is photographed by the camera 2000 (refer to FIG. 1). An image of a target object displayed on the display 1110 may be identical to an image of the target object displayed on a display unit of the camera 2000. The sound output module 1120 may acoustically output a focus change signal and a focus set signal to be heard by a person.

The user input receiver 1200 may include a touch screen panel 1210. The display 1110 may be combined with the touch screen panel 1210 of the user input receiver 1200 and provided as a touch screen. For example, the touch screen may include an integrated module in which the touch screen panel 1210 is stack-combined with a display panel. The touch screen panel 1210 may detect a touch input of a user and output a touch event value corresponding to a detected touch signal. The touch signal may include various types of touch sensors, such as an electrocapacitive type touch sensor, a pressure-sensing touch sensor, or a piezoelectric type touch sensor. The electrocapacitive type touch sensor employs a dielectric material coated on the surface of a touch screen and detects the coordinates of a touch when a part of the body of a user touches on the surface of the touch screen. The pressure-sensing type touch sensor includes two electrode plates embedded in a touch screen, and when a user touches the touch screen, the pressure-sensing type touch sensor calculates the coordinates or a touch by detecting a current that flows therethrough as portions of upper and lower electrode plates at a touched location contact each other. While a touch event generated at a touch screen may be mainly generated by a finger of a person, a touch event may also be generated by an object that includes a conductive material and may apply an electrocapacitive change.

According to an embodiment, the touch screen panel 1210 may receive a user input for setting focus at or changing focus to a certain point of a target object in a target object image displayed on the display panel of the display 1110. The touch screen panel 1210 may receive a touch input of a user at an area corresponding to a particular point to change focus to in a target object image displayed on the display panel of the display 1110.

The user input receiver 1200 may receive a user input that instructs the camera 2000 to photograph a target object based on changed focus. According to an embodiment, the touch screen panel 1210 may receive a touch input at a photographing button UI displayed on the display 1110.

The user input receiver 1200 may further include a microphone (not shown) and a motion sensor (not shown). The microphone may receive a user's voice or other sounds and transform the same into audio data. According to an embodiment, the microphone may receive a user's voice command for changing focus of the camera 2000 regarding a target object or a user's voice command that instructs the camera 2000 to photograph a target object. The controller 1500 may encode a user's voice input via the microphone into an electric signal, such as a focus change signal or a photographing signal, such that the electric signal may be transmitted to the camera 2000.

The motion sensor may detect movement of the main body of the wearable device 1000. The wearable device 1000 may be rotated or tilted in various directions. Here, the motion sensor may detect movement characteristics, such as a rotating direction, a rotating angle, and a tilting angle, by using at least one of various sensors, such as a geomagnetic sensor, a gyro sensor, and an acceleration sensor. The motion sensor may receive a user input that moves the wearable device 1000, whereas the controller 1500 may encode the user input to an electric signal for changing focus of the camera 2000 regarding a target object or an electric signal that instructs the camera 2000 to photograph the target object.

The memory 1300 may include at least one of an internal memory (not shown) and an external memory (not shown).

The internal memory may include at least one of a volatile memory (e.g., a dynamic RAM (DRAM), a static RAM (SRAM), a synchronous dynamic RAM (SDRAM), etc.), a non-volatile memory (e.g., an one-time programmable ROM (OTPROM), a programmable ROM (PROM), an erasable/programmable ROM (EPROM), an electrically erasable/programmable ROM (EEPROM), a mask ROM, a flash ROM, etc.), a hard disk drive (HDD), and a solid state drive (SSD). The external memory may include at least one of a compact flash (CF), a secure digital (SD), a micro secure digital (micro-SD), a mini secure digital (mini-SD), an extreme digital (xD), and a memory stick, for example.

According to an embodiment, the controller 1500 may store information regarding a focus-changed point based on a user input received by the user input receiver 1200 or image data regarding a target object received from the camera 2000 in the memory 1300. Furthermore, the controller 1500 may load and process information or data stored in the memory 1300, such as information regarding a focus-changed point.

The communicator 1400 may communicate with various types of external devices via various communication protocols. The communicator 1400 may include a short-distance wireless communicator 1410. According to an embodiment, the communicator 1400 may further include a mobile communicator, a wire communicator, and a wireless communicator. The short-distance wireless communicator 1410 may include at least one of a Bluetooth chip, a Wi-Fi chip, a wireless communication chip, a NFC chip, and a beacon chip. The Wi-Fi chip and the Bluetooth chip may perform communications via Wi-Fi protocol and Bluetooth protocol, respectively. In case of using the Wi-Fi chip or the Bluetooth chip, various connection information including a SSID and a session key may be exchanged first, a communication may be established by using the same, and then various information may be transmitted or received. The wireless communication chip refers to a chip that performs communications via various communication standards including a 3rd generation (3G), a 3rd generation partnership project (3GPP), and a long-term evolution (LTE). The NFC chip refers to a chip that operates according to the near field communication (NFC) protocol using the 13.56 MHz band from among various RF-ID frequency bands including 135 kHz, 13.56 MHz, 433 MHz, 860~960 MHz, and 2.45 GHz.

The communicator 1400 may receive image data regarding a target object being photographed by the camera 2000 from the camera 2000. The controller 1500 may communicate with various external devices by using the communicator 1400. According to an embodiment, the controller

1500 may synchronize with the camera 2000 by using the short-distance wireless communicator 1410 of the communicator 1400, such that an image of a target object photographed by the camera 2000 is displayed on the display 1110.

The controller 1500 may include at least one of a RAM 1510, a ROM 1520, a CPU 1530, a graphic processing unit (GPU) 1540, and a bus 1550. The RAM 1510, the ROM 1520, the CPU 1530, and the GPU 1540 may be connected to one another via the bus 1550.

The CPU 1530 accesses the memory 1300 and performs a booting operation by using an operating system (OS) stored in the memory 1300. Next, the CPU 1530 performs various operations by using various programs, contents, and data stored in the memory 1300.

Command sets for booting a system are stored in the ROM 1520. According to an embodiment, when a turn-on command is input and power is supplied to the wearable device 1000, the CPU 1530 may boot a system by copying an OS stored in the memory 1300 and executing the OS according to commands stored in the ROM 1520. When the booting operation is completed, the CPU 1530 copies various programs stored in the memory 1300 to the RAM 1510 and executes the programs copied to the RAM 1510, thereby performing various operations. When the wearable device 1000 is completely booted, the GPU 1540 displays an UI screen image at an area of the display 1110. In detail, the GPU 1540 may generate a screen image having displayed therein an electronic document including various objects, such as contents, icons, and menus. The GPU 1540 calculates property values, such as coordinates, shapes, sizes, and colors for displaying respective objects, according to layouts of screen images. Next, the GPU 1540 may generate screen images of various layouts including objects based on calculated property values. Screen images generated by the GPU 1540 may be provided to the display 1110 and displayed at respective areas of the display 1110.

According to an embodiment, the controller 1500 may synchronize the camera 2000 with the wearable device 1000 to display an image regarding a target object photographed by the camera 2000, which is displayed on a pre-view display of the camera 2000, on the display 1110. The controller 1500 may pair the wearable device 1000 with the camera 2000 by using short-range wireless communication signals via the short-distance wireless communicator 1410.

According to an embodiment, the controller 1500 may encode information regarding focus changed based on a user input for changing focus to a particular point of a target object received by the touch screen panel 1210 to an electric signal. The controller 1500 may also transmit the encoded electric signal to the camera 2000 by using the short-distance wireless communicator 1410.

According to an embodiment, the user input receiver 1200 may receive a user input that instructs the camera 2000 to photograph a target object based on changed focus, and the controller 1500 may encode the received user input that instructs the camera 2000 to photograph to an electric signal. The controller 1500 may also transmit the encoded electric signal to the camera 2000 via the communicator 1400.

Furthermore, although not shown in FIG. 9, according to an embodiment, the wearable device 1000 may further include a USB port for connecting a USB connector, various external input ports for connecting various external devices or terminals, e.g., a headset, a mouse, a LAN, etc., a digital multimedia broadcasting (DMB) chip for receiving and processing DMB signals, and various sensors.

The above-stated components of the wearable device 1000 may be referred to as otherwise. Furthermore, the wearable device 1000 according to an embodiment may include at least one of the above-stated components, where some of the above-stated components may be omitted or additional components may be added.

Figure 10:
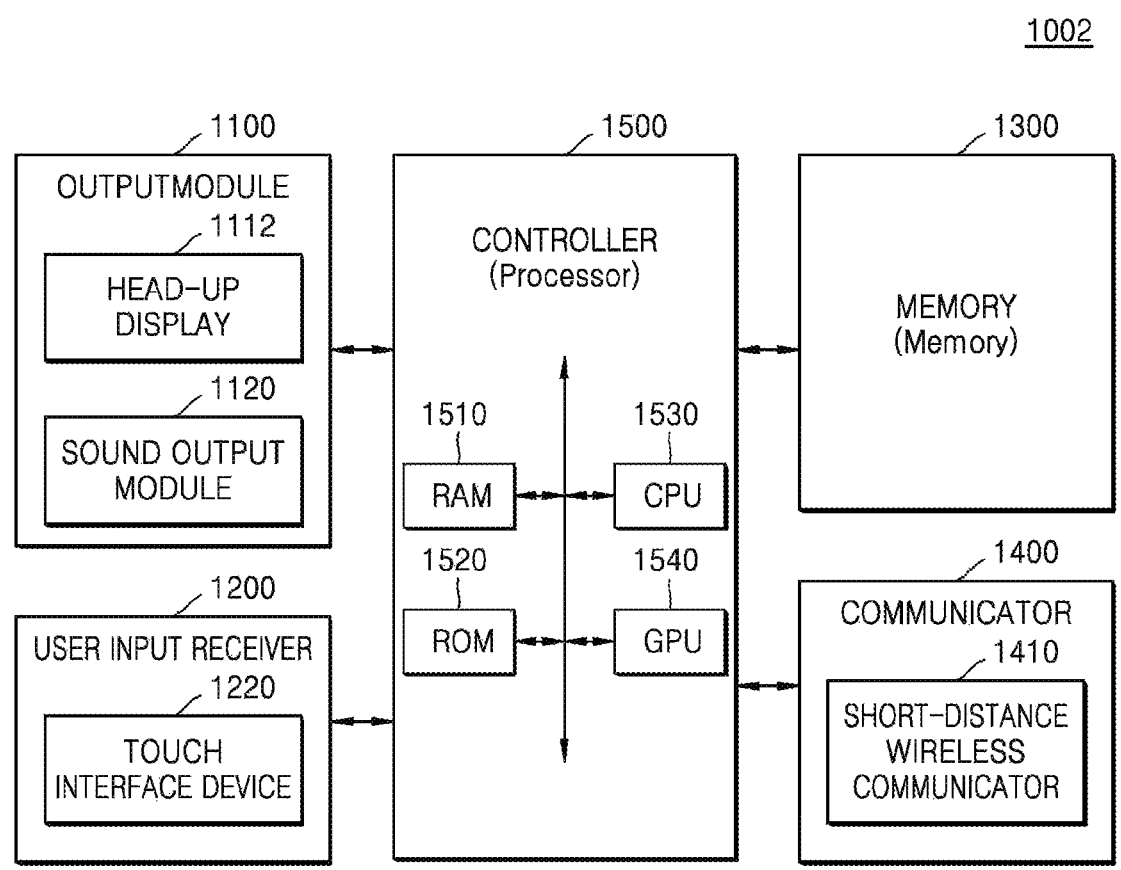

FIG. 10 is a block diagram showing a configuration of an wearable device 1002 according to an embodiment. The wearable device 1002 may be the wearable device 1000-2 shown in FIG. 5. According to an embodiment, the wearable device 1002 may be an eyeglass-type wearable device or a head-mounted display (HMD) having communication function and data processing function, but is not limited thereto.

The wearable device 1002 shown in FIG. 10 may include the same components as the wearable device 1000 shown in FIG. 9. The differences between the wearable device 1002 shown in FIG. 10 and the wearable device 1000 shown in FIG. 9 are that the output module 1100 includes the HUD 1112 and the user input receiver 1200 includes the touch interface device 1220. Therefore, since descriptions of the components of the wearable device 1002 shown in FIG. 9 that are identical to the components of the wearable device 1000 shown in FIG. 9 will be omitted.

Referring to FIG. 10, the wearable device 1002 may include the output module 1100, the user input receiver 1200, the memory 1300, the communicator 1400, and the controller 1500.

The output module 1100 may include the HUD 1112. The HUD 1112 may provide an image regarding a target object photographed by the camera 2000 to a user as an augmented reality image.

The user input receiver 1200 may include the 1220. The touch interface device 1220 may receive a user input for moving focus to a particular point of an image of a target object displayed on the display 1110 which a user desires to set focus at or change focus to. According to an embodiment, the touch interface device 1220 may be a touch pad. The touch interface device 1220 may receive a touch input or a swipe input. The controller 1500 may encode information regarding focus changed based on a user input received by the touch interface device 1220 into an electric signal and transmit the encoded electric signal to the camera 2000 via the communicator 1400.

Figure 11:
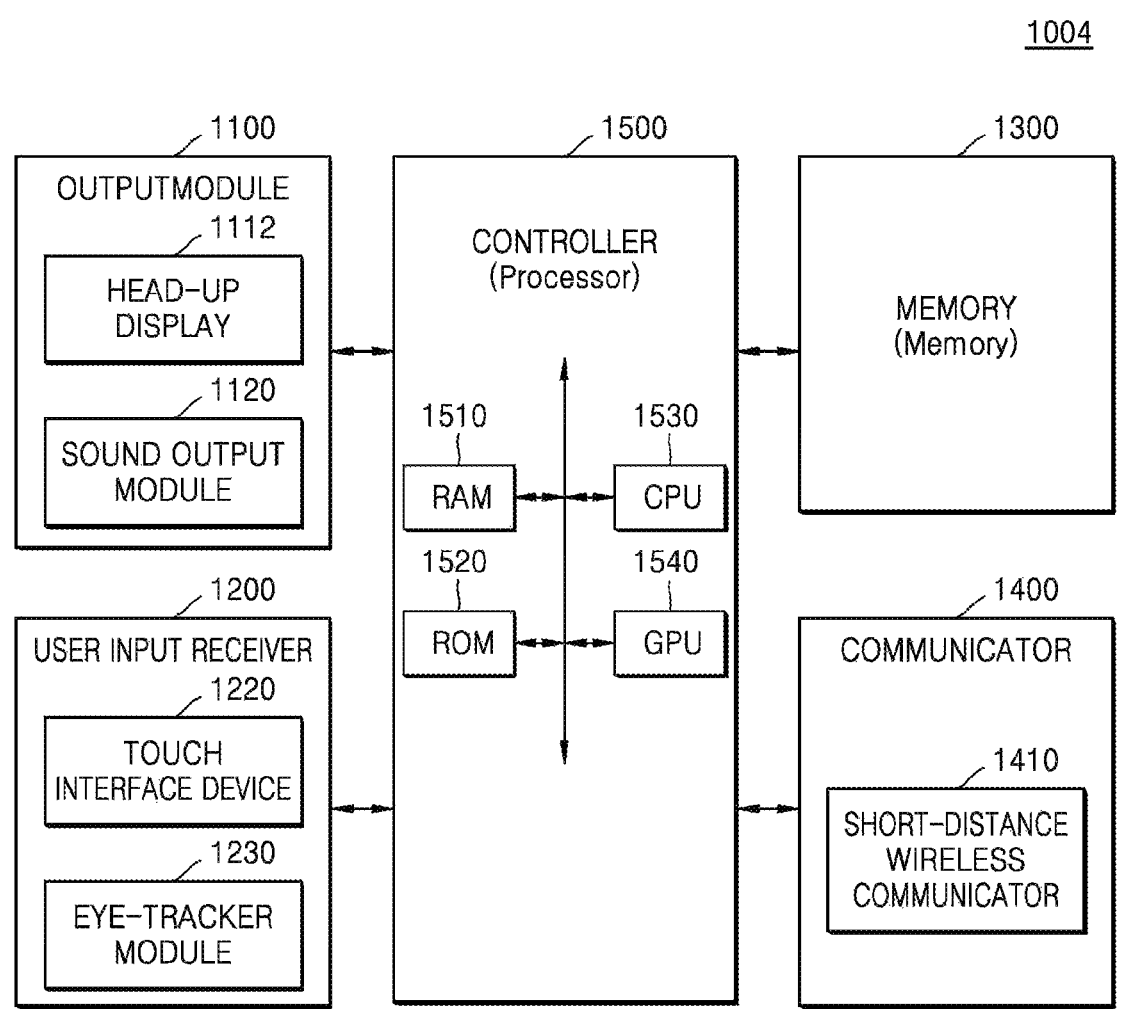

FIG. 11 is a block diagram showing a configuration of a wearable device 1004 according to an embodiment. The wearable device 1004 may be the wearable device 1000-2 shown in FIG. 5. According to an embodiment, the wearable device 1004 may be an eyeglass-type wearable device or a head-mounted display (HMD) having communication function and data processing function, but is not limited thereto. The wearable device 1004 shown in FIG. 11 may include the same components as the wearable device 1002 shown in FIG. 10. The difference between the wearable device 1004 shown in FIG. 11 and the wearable device 1002 shown in FIG. 10 is that the user input receiver 1200 includes the 1220 and an eye-tracker module 1230.

Referring to FIG. 11, the wearable device 1004 may include the output module 1100, the user input receiver 1200, the memory 1300, the communicator 1400, and the controller 1500.

The user input receiver 1200 may include the 1220 and the eye-tracker module 1230. The eye-tracker module 1230 may recognize movements of the pupils of a user regarding a particular point of an image of a target object displayed at the HUD 1112, the particular point to which a user wants to change focus. The eye-tracker module 1230 may recognize a direction of eyes of a user based on movements of the pupils of the user. According to an embodiment, the eye-tracker module 1230 may recognize whether the pupils of a user stay at the particular point to change focus to in an image of a target object displayed on the HUD 1112 for a pre-set time period. The controller 1500 may analyze information regarding including a direction of eyes of the user based on movements of pupils of the user recognized by the eye-tracker module 1230 and information regarding whether movements of the pupils of the user are stopped for a pre-set time period and encode the analyzed information regarding movements of the pupils of the user into an electric signal so as to control the camera 2000 to change focus to the particular point regarding the target object.

According to an embodiment, the eye-tracker module 1230 may recognize movement of the pupils of a user for blinking eyes for a pre-set number of times at a particular point of a target object image displayed on the HUD 1112. The controller 1500 analyzes the number of the eye-blinks recognized by the eye-tracker module 1230 and control the camera 2000 to change focus to a particular point regarding a target object based on information regarding the number of the eye-blinks of the user. For example, the eye-tracker module 1230 may receive a user input corresponding to three eye-blinks at a particular point of a target object image, and the controller 1500 may encode the user input into an electric signal that instructs the camera 2000 to change focus to the particular point of the target object at which the user blinked the eyes three times. Furthermore, the controller 1500 may transmit the electric signal to the camera 2000 via the communicator 1400.

Figure 12:
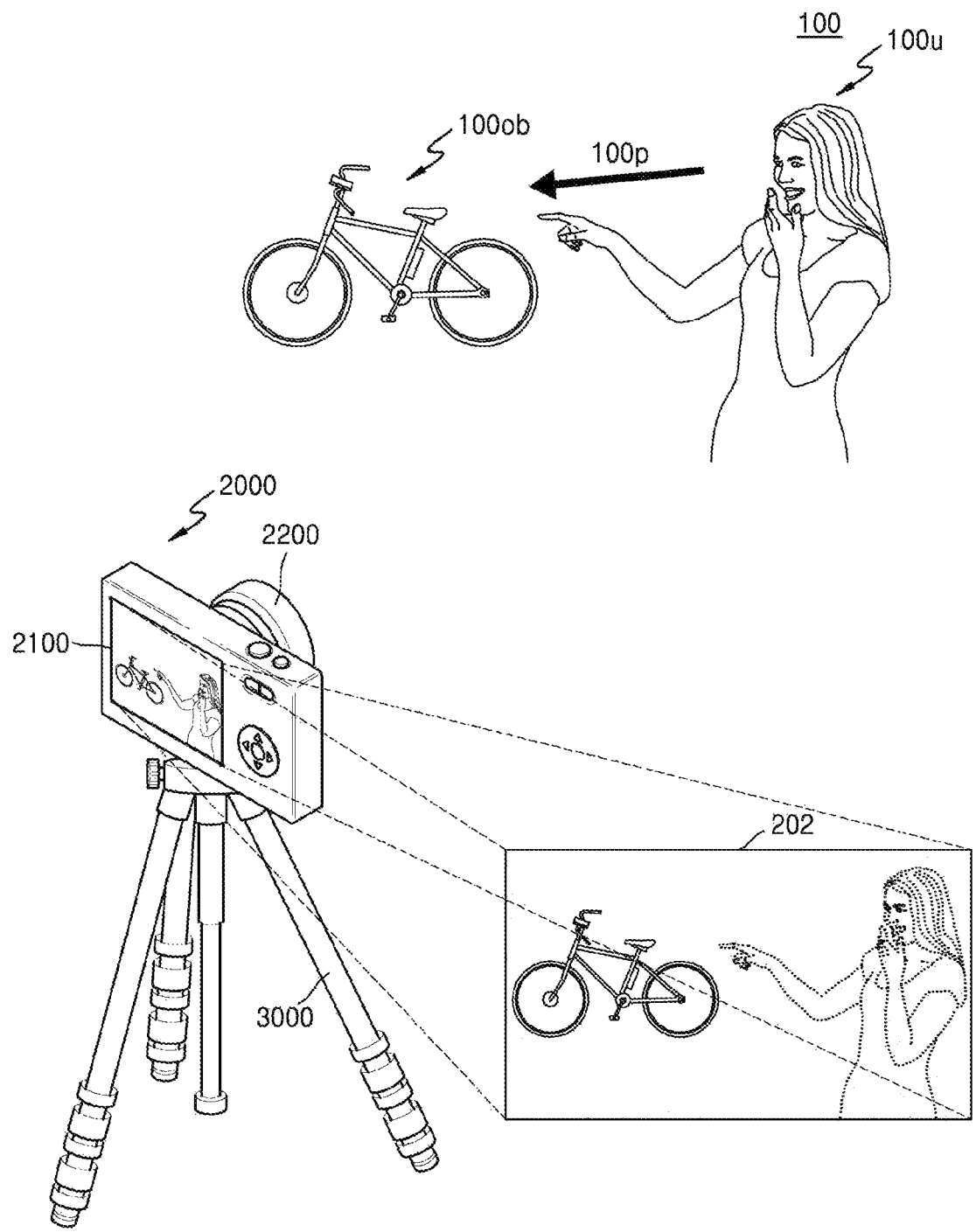
FIG. 12 is a diagram showing a method used by the camera to recognize a user's gesture and change focus, according to an embodiment.

FIG. 12 is a diagram showing a method by which the camera 2000 recognizes a user's gesture and changes focus, according to an embodiment.

Referring to FIG. 12, the camera 2000 may include the preview display 2100 and the lens 2200 and may be mounted on a stand 3000. The camera 2000 may photograph the target object 100 including a user 100*u* and an object 100*ob* and display a target object image 202 regarding the target object 100 on the preview display 2100. The object 100*ob* may be an object or a person included in the target object 100 viewed via the lens 2200 of the camera 2000. In FIG. 12, the object 100*ob* is a bicycle.

The camera 2000 may recognize the user 100*u* and recognize a gesture expressed by a fingertip or an arm of the user 100*u*, a direction pointed by the fingertip or the arm, and the object 100*ob* located in the direction. The camera 2000 may re-focus the target object 100 by recognizing the object 100*ob* located at a direction pointed by the user 100*u* and focusing at the recognized target object 100*ob*. The camera 2000 may display the target object image 202 on the preview display 2100. The camera 2000 may clearly display the object 100*ob* located in the direction pointed by the user 100*u* and blur the other object, that is, the user 100*u*.

If the user 100*u* becomes a target object himself or herself, when the user 100*u* simply points out the object 100*ob* to focus at or change focus to, the camera 2000 shown in FIG. 12 may focus at or change focus to the object 100*ob* located at a direction pointed by the user 100*u*. Therefore, the user 100*u* may obtain a desired picture even when the user 100*u* becomes a target object himself or herself.

Figure 13:
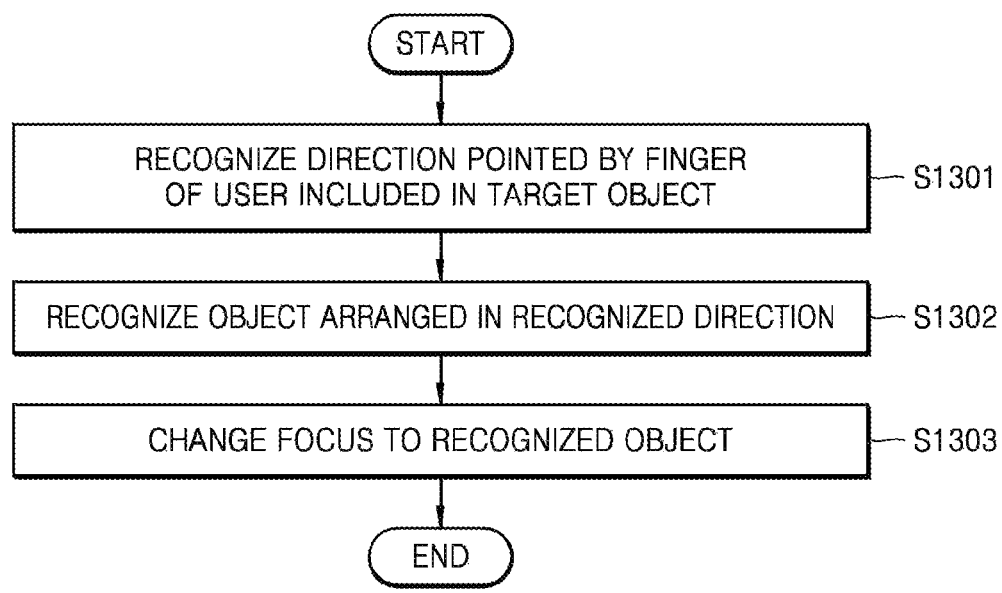
FIG. 13 is a flowchart of a method used by the camera to recognize a user's gesture and change focus of a recognized object, according to an embodiment.

FIG. 13 is a flowchart for describing a method by which the camera 2000 recognizes a user's gesture and changes focus to a recognized object, according to an embodiment.

In operation S1301, the camera 2000 recognizes a direction pointed by a finger of a user included in a target object. If a user becomes a target object himself or herself, the camera 2000 may recognize the user and a direction pointed by a body part of the user, e.g., a finger or an arm. According to an embodiment, the camera 2000 may recognize the eyes of a user and a direction viewed by the eyes of the user.

In operation S1302, the camera 2000 recognizes an object located in the recognized direction. The camera 2000 may recognize an object located in a direction recognized based on a gesture of a user at a point at which boundary values are changed. The camera 2000 may recognize an object in a direction pointed by a user via a 2D sensor 2310 (refer to FIG. 14) or a 3D sensor 2320 (refer to FIG. 16). Detailed descriptions thereof will be given below with reference to FIGS. 14 and 16.

In operation S1303, the camera 2000 changes focus to the recognized object. The camera 2000 may have automatic focusing function or a function for manually changing focus. The camera 2000 may change focus set at an arbitrary point of the target object to the object recognized in the operation S1302. According to an embodiment, the camera 2000 may capture a multi-focus image by focusing the arbitrary point of the target object and the object recognized in the operation S1302.

According to an embodiment, the camera 2000 may extract information regarding the recognized object and display the extracted information in an image.

Figure 14:
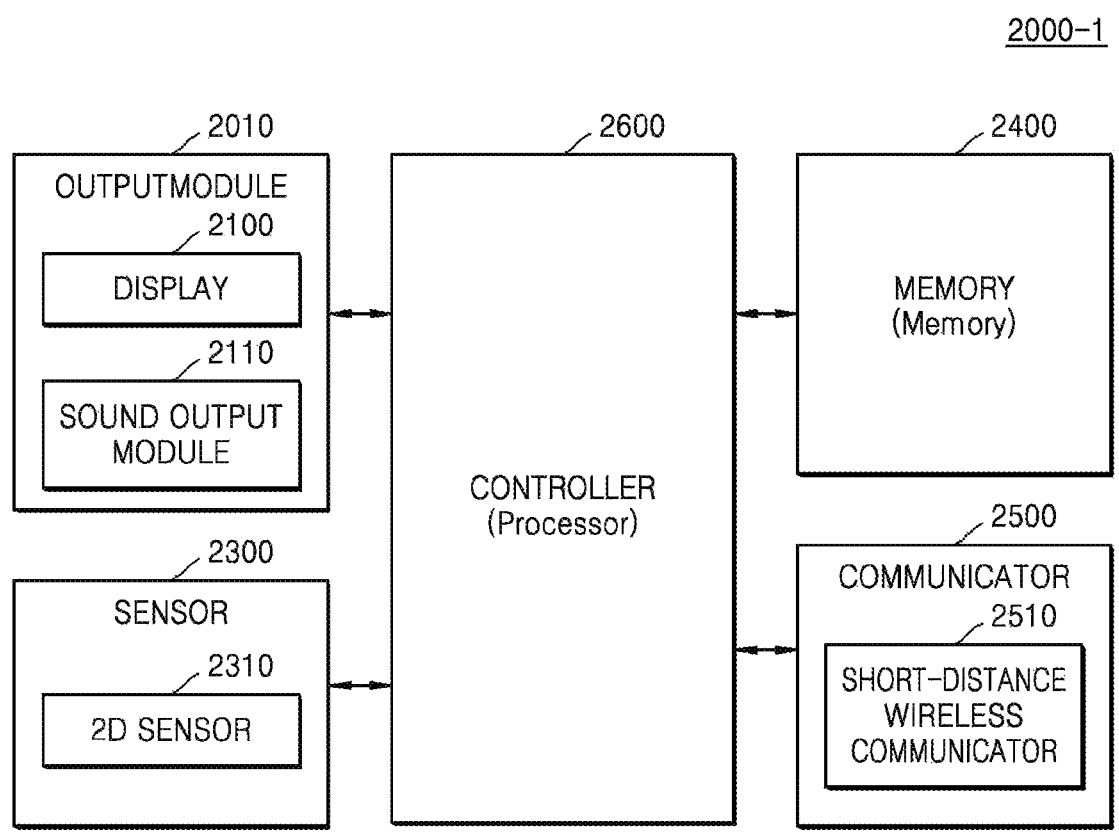
FIG. 14 is a block diagram showing components of a camera according to an embodiment.
Figure 15:
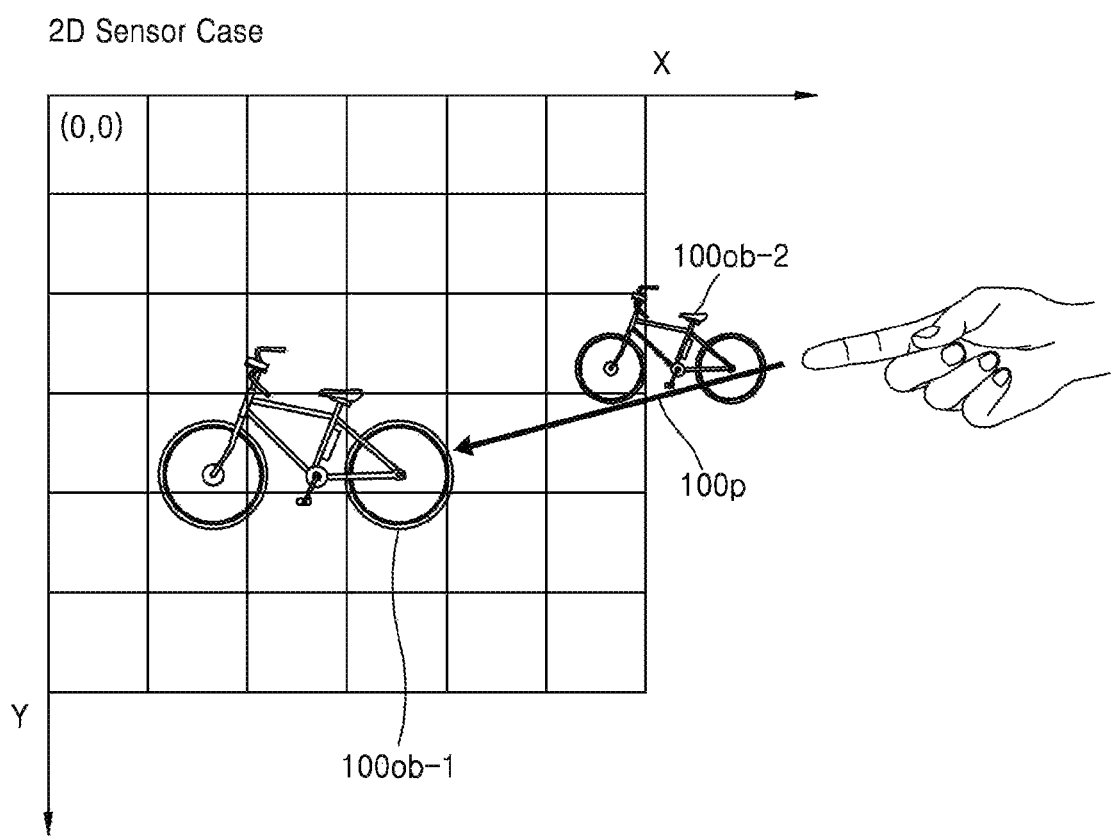
FIG. 15 is a diagram for describing a method used by the camera according to the embodiment of FIG. 14 recognizes an object.

FIG. 14 is a block diagram showing components of a camera 2000-1 that recognizes a gesture of a user via a 2D sensor according to an embodiment, and FIG. 15 is a diagram for describing a method by which the camera 2000-1 according to the embodiment of FIG. 14 recognizes an object by using a 2D sensor 2310.

Referring to FIGS. 14 and 15, the camera 2000-1 may include an output module 2010, a sensor 2300, a memory 2400, a communicator 2500, and a controller 2600.

The output module 2010 may include the preview display 2100 and an sound output module 2110. The preview display 2100 may include a display panel and a controller that controls the display panel. The display panel may be embodied as one of various types of display panels, such as a liquid crystal display (LCD) panel, an organic light-emitting diode (OLED) panel, an active-matrix organic light-emitting diode (AM-OLED) panel, and a plasma display panel (PDP) panel. The preview display 2100 may display an image of a target object that is viewed via the lens 2200. The sound output module 2110 may output a human-audible acoustic signal indicating that focus is changed or set to a certain point of a target object or an object recognized by the controller 2600.

The sensor 2300 may include the 2D sensor 2310. The 2D sensor 2310 may recognize a user in a RGB environment and recognize a direction pointed by a body part (e.g., a finger or an arm) of the user. The 2D sensor 2310 may also recognize a direction viewed by the eyes of a user. The 2D sensor 2310 may recognize an object located in a direction pointed by a body part of a user and/or a direction viewed by the eyes of the user and provide information regarding the recognized object to the controller 2600.

In the embodiment shown in FIG. 15, the 2D sensor 2310 may obtain vector values regarding a user-pointed direction 100*p* pointed by a finger of a user on a x-y coordinates plane. The 2D sensor 2310 may recognize a change of boundary values in the direction 100*p* and recognize a first object 100*ob*-1 at a location corresponding to a significant boundary value change. According to the vector values regarding the user-pointed direction 100*p* recognized by the 2D sensor 2310, a second object 100*ob*-2 is located in a direction corresponding to other vector values, and thus the 2D sensor 2310 recognizes the first object 100ob-1 and does not recognize the second object 100ob-2.

According to an embodiment, the 2D sensor 2310 provides location vector values and the shape of the recognized first object 100ob-1 and information regarding the shape of the recognized first object 100ob-1 to the controller 2600. The controller 2600 may change focus to the first object 100ob-1 and display an image with changed focus on the preview display 2100. The preview display 2100 may clearly display the first object 100ob-1 and blur the second object 100ob-2.

The memory 2400 may include at least one of an internal memory (not shown) and an external memory (not shown). The internal memory may include at least one of a volatile memory (e.g., a dynamic RAM (DRAM), a static RAM (SRAM), a synchronous dynamic RAM (SDRAM), etc.), a non-volatile memory (e.g., an one-time programmable ROM (OTPROM), a programmable ROM (PROM), an erasable/programmable ROM (EPROM), an electrically erasable/programmable ROM (EEPROM), a mask ROM, a flash ROM, etc.), a hard disk drive (HDD), and a solid state drive (SSD). The external memory may include at least one of a compact flash (CF), a secure digital (SD), a micro secure digital (micro-SD), a mini secure digital (mini-SD), an extreme digital (xD), and a memory stick, for example.

The memory 2400 may store information regarding an object recognized by the sensor 2300, e.g., location vector values of the object, information regarding the shape of the object, and store information regarding a focused object or information indicating whether to change focus. Furthermore, the memory 2400 may store an image obtained by photographing a target object in the form of a file.

The communicator 2500 may communicate with various types of external devices via various communication protocols. The communicator 2500 may include a short-distance wireless communicator 2510. According to an embodiment, the communicator 2500 may be synchronized with the wearable device 1000 as shown in FIGS. 1, 4A, and 5 via short-range wireless communication signals.

The controller 2600 may focus at or change focus to an object recognized by the sensor 2300 from among target objects. Referring to FIG. 15, from among target objects, focus may be changed to the first object 100ob-1 recognized by the 2D sensor 2310, and thus the preview display 2100 may clearly display the first object 100ob-1 and blur the second object 100ob-2 that is not recognized by the 2D sensor 2310.

Figure 16:
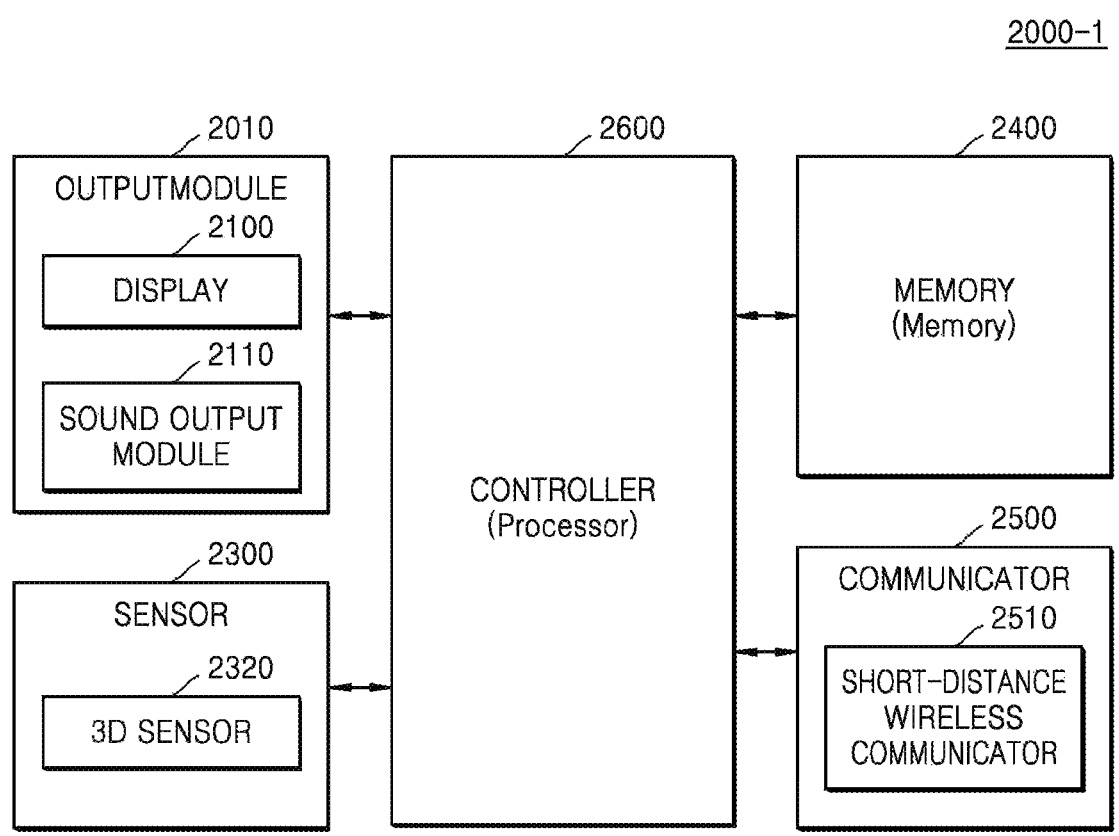
FIG. 16 is a block diagram showing components of a camera according to an embodiment.
Figure 17:
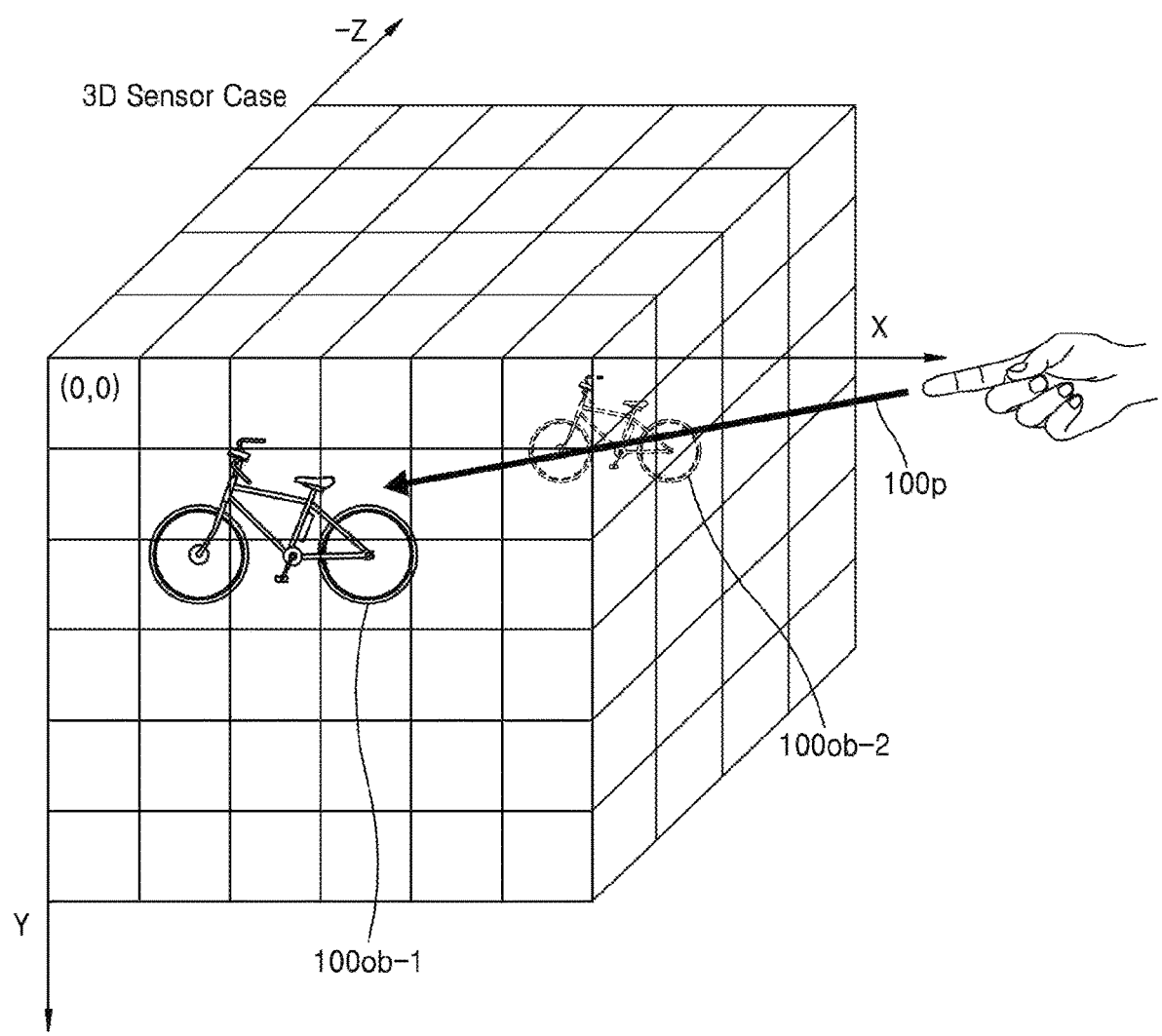
FIG. 17 is a diagram for describing a method used by the camera according to the embodiment of FIG. 16 to recognize an object.

FIG. 16 is a block diagram showing components of a camera 2000-1 that recognizes a gesture of a user via a 3D sensor according to an embodiment, and FIG. 17 is a diagram for describing a method by which the camera 2000-1 according to the embodiment of FIG. 16 recognizes an object by using a 3D sensor 2320.

Referring to FIGS. 16 and 17, the camera 2000-1 may include the output module 2010, the sensor 2300, the memory 2400, the communicator 2500, and the controller 2600. Unlike in the camera 2000-1 shown in FIG. 14, the sensor 2300 includes the 3D sensor 2320 in the camera 2000-2 shown in FIG. 16. Therefore, descriptions of components identical to those shown in FIG. 14 will be omitted.

The sensor 2300 may include the 3D sensor 2320. The 3D sensor 2320 may recognize a user in a RGB-D environment and recognize a direction pointed by a body part (e.g., a finger or an arm) of the user. Unlike the 2D sensor 2310 (refer to FIG. 14), the 3D sensor 2320 may obtain 3D vector values regarding an object and 3D depth information.

In the embodiment shown in FIG. 17, the 3D sensor 2320 may obtain 3D space vector values x, y, and z regarding a user-pointed direction 100p in which a finger of a user is pointing. The 3D sensor 2320 may obtain 3D depth information regarding the user-pointed direction 100p. According to an embodiment, the 3D sensor 2320 may recognize 3D depth information regarding two objects, that is, the first object 100ob-1 and the second object 100ob-2 located in a direction in which a user is pointing in a 3D space, and may recognize whether an object pointed at by the user is the first object 100ob-1 in the front or the second object 100ob-2 in the back. The 3D sensor 2320 may be embodied by using any of techniques utilized by a 3D camera, e.g., a technique for obtaining 3D depth information by irradiating an infrared ray to an object and detecting an infrared ray returning from the object or a technique for obtaining 3D depth information by tilting a lens and obtaining information regarding distances at which focus is set to objects, etc.

The 3D sensor 2320 may provide information regarding a direction pointed by a user and information regarding an object recognized based on 3D depth information to the controller 2600. The controller 2600 may change focus to the recognized object based on information regarding the object obtained from the 3D sensor 2320. The preview display 2100 may clearly display an object to which focus is changed by the controller 2600 and blur the remaining of target objects.

One or more embodiments may be implemented by a computer-readable recording medium, such as a program module executed by a computer. The computer-readable recording medium may be an arbitrary available medium accessible by a computer, and examples thereof include all volatile media (e.g., RAM) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium.

While the inventive concept has been particularly shown and described with reference to embodiments thereof, it will be understood by those of ordinary skill in the art that various changes in form and details may be made therein without departing from the spirit and scope of the inventive concept as defined by the following claims. Hence, it will be understood that the embodiments described above are not limiting the scope of the inventive concept. For example, each component described in a single type may be executed in a distributed manner, and components described distributed may also be executed in an integrated form.

The scope of the inventive concept is indicated by the claims which will be described in the following rather than the detailed description of the embodiments, and it should be understood that the claims and all modifications or modified forms drawn from the concept of the claims are included in the scope of the inventive concept.

What is claimed is:

1. A method performed by an eyeglass-type computing device to change focus of a camera photographing a target object, the method comprising:
   receiving a target object image, which is displayed on a preview display of the camera and comprises at least one target object to be photographed by the camera, from the camera;
   displaying the received target object image as an augmented reality image on a display of the eyeglass-type computing device;
   receiving a user's touch input, via a touch interface of the eyeglass-type computing device, for moving focus of the camera from a first focus point to a second focus point in the target object image displayed on the display of the eyeglass-type computing device;
   encoding the received user's touch input to an electric signal; and
   transmitting the electric signal to the camera, through a wireless communication, for requesting the camera to change focus from the first focus point to the second focus point in the target object image.

2. The method of claim 1, wherein the eyeglass-type computing device further comprises an eye tracker configured to track movements of eyes of a user using the eyeglass-type computing device,
   wherein, in the receiving of the user's touch input, a movement of the eyes of the user for selecting a location to change focus of the camera in the target object image displayed on the display is recognized via the eye tracker.

3. The method of claim 2, wherein the receiving of the user's touch input comprises determining whether the eyes of the user keep looking at the location to which focus of the camera is to be changed for a pre-set time period.

4. The method of claim 2, wherein the receiving of the user's touch input comprises determining whether the eyes of the user blink for a pre-set number of times while the eyes of the user keep looking at the location to which focus of the camera is to be changed.

5. The method of claim 1, wherein the eyeglass-type computing device further comprises a spatial gesture recognizing device configured to recognize a spatial gesture of a user using the eyeglass-type computing device, and,
   in the receiving of the user's touch input, a user input for selecting a location to change focus of the camera to in the target object image displayed on the display is received via the spatial gesture recognizing device.

6. A non-transitory computer readable recording medium having recorded thereon a computer program for implementing the method of claim 1.

7. An eyeglass-type computing device configured to change focus of a camera photographing a target and comprising:
   a communicator configured to receive a target object image, which is displayed on a preview display of the camera and comprises at least one target object to be photographed by the camera, from the camera;
   a display configured to display the target object image as an augmented reality image;
   a touch interface configured to receive a user's touch input for moving focus of the camera from a first focus point to a second focus point in the target object image displayed as the augmented reality image on the display of the eyeglass-type computing device; and
   a controller configured to encode the received user's touch input to an electric signal, and transmit the electric signal to the camera, through a wireless communication, for requesting the camera to change focus from the first focus point to the second focus point in the target object image.

8. The eyeglass-type computing device of claim 7, further comprising an eye tracker configured to track movements of eyes of a user regarding a particular point to change focus of the camera in the target object image displayed on the display, and
   the controller is configured to change focus of the camera based on the particular point of the target object image recognized by the eye tracker.

9. The eye-glass computing device of claim 8, wherein the eye tracker is configured to determine whether the eyes of the user keep looking at the particular point to which focus of the camera is to be changed to for a pre-set time period, and
   the controller is configured to change focus of the camera based on the particular point at which the eyes of the user keep looking for the pre-set time period.

10. The eyeglass-type computing device of claim 8, wherein the eye tracker is configured to determine whether the eyes of the user blink for a pre-set number of times while the eyes of the user keep looking at the particular point to which focus of the camera is to be changed to.

11. The eyeglass-type computing device of claim 7, further comprising a spatial gesture recognizing device configured to recognize a spatial gesture of a user using the eyeglass-type computing device,
   wherein the spatial gesture recognizing device is configured to receive a user input for selecting a location to change focus of the camera in the target object image displayed on the display.

* * * * *